US012442047B2

(12) United States Patent
Chen et al.

(10) Patent No.: US 12,442,047 B2
(45) Date of Patent: Oct. 14, 2025

(54) METHODS FOR DETECTING *BORDETELLA*

(71) Applicant: Quest Diagnostics Investments LLC, Secaucus, NJ (US)

(72) Inventors: Jules Chen, Irvine, CA (US); Michelle Tabb, Santa Ana, CA (US)

(73) Assignee: Quest Diagnostics Investments LLC, Secaucus, NJ (US)

( * ) Notice: Subject to any disclaimer, the term of this patent is extended or adjusted under 35 U.S.C. 154(b) by 0 days.

(21) Appl. No.: 16/086,714

(22) PCT Filed: Mar. 23, 2017

(86) PCT No.: PCT/US2017/023735
§ 371 (c)(1),
(2) Date: Sep. 20, 2018

(87) PCT Pub. No.: WO2017/165599
PCT Pub. Date: Sep. 28, 2017

(65) Prior Publication Data
US 2019/0382826 A1 Dec. 19, 2019

Related U.S. Application Data

(60) Provisional application No. 62/312,883, filed on Mar. 24, 2016.

(51) Int. Cl.
*C12Q 1/689* (2018.01)

(52) U.S. Cl.
CPC ....... *C12Q 1/689* (2013.01); *C12Q 2600/106* (2013.01); *C12Q 2600/158* (2013.01); *C12Q 2600/16* (2013.01)

(58) Field of Classification Search
None
See application file for complete search history.

(56) References Cited

U.S. PATENT DOCUMENTS

| | | | | |
|---|---|---|---|---|
| 10,465,252 B2 * | 11/2019 | Tabb | C12Q 1/689 |
| 2008/0254062 A1 | 10/2008 | Harvill | |
| 2009/0181366 A1 * | 7/2009 | Ong | C12Q 1/6851 435/6.12 |
| 2009/0197262 A1 * | 8/2009 | Tabb | C12Q 1/689 435/6.16 |
| 2014/0309138 A1 * | 10/2014 | Poetter | C12Q 1/686 506/9 |

FOREIGN PATENT DOCUMENTS

| | | | |
|---|---|---|---|
| CA | 2840964 A1 | 1/2013 | |
| WO | WO 2009/055239 A1 | 4/2009 | |
| WO | WO 2010/124281 A2 | 10/2010 | |
| WO | WO-2013006793 A2 * | 1/2013 | C12Q 1/68 |
| WO | WO-2015066530 A1 * | 5/2015 | C12Q 1/6806 |
| WO | WO-2016085955 A1 * | 6/2016 | C12N 1/06 |

OTHER PUBLICATIONS

Antila (J. of Medical Microbiology, vol. 55, pp. 1043-1051, 2006) (Year: 2006).*
Buck et al. (BioTechniques (1999) 27(3): 528-536) (Year: 1999).*
Lowe et al. (Nucleic Acids Research (1990) 18(7): 1757-1761) (Year: 1990).*
Selvaraju et al. (Diagnostic Microbiology and Infectious disease, vol. 78, pp. 232-236, 2014). (Year: 2014).*
Kerdsin (Jpn. J. Infect. Dis., vol. 63, pp. 173-180, 2010) (Year: 2010).*
Grogan et al. (J. of Medical Microbiology, vol. 60, pp. 722-729, 2011) (Year: 2011).*
International Search Report and Written Opinion date Aug. 25, 2017, in PCT/US2017/023735.
Antila et al., "*Bordetella holmesii* DNA is not detected in nasopharyngeal swabs from Finnish and Dutch patients with suspected pertussis," Journal of Medical Microbiology, 2006, 55:1043-1051.
Mortensen et al., "In vitro activity of gemifloxacin and other antimicrobial agents against isolates of *Bordetella pertussis* and *Bordetella parapertussis*," Journal of Antimicrobial Chemotherapy, 2000, 45(SuppS1):47-49.
Supplementary European Search Report in EP 17771121.5 dated Oct. 7, 2019.
Arbefeville et al., "Optimizing polymerase chain reaction testing for the diagnosis of pertussis: current perspectives," Pathology and Laboratory Medicine International, Sep. 7, 2015, 67-73.
Pittet et al., "Diagnosis of Whooping Cough in Switzerland: Differentiating *Bordetella pertussis* from *Bordetella holmesii* by Polymerase Chain Reaction," PLOS One, Feb. 19, 2014, 9(2):e88936, 5 pages.
Cloud et al., "Description of a multiplex Bordetella pertussis and Bordetella parapertussis LightCycler PCR assay with inhibition control," Diagnostic Microbiology and Infectious Disease, 2003, 46:189-195.
Office Action dated Jul. 31, 2020, in EP 17771121.5.
Sloan et al., "Multiplex LightCycler PCR Assay for Detection and Differentiation of Bordetella pertussis and Bordetella parapertussis in Nasopharyngeal Specimens," Journal of Clinical Microbiology, Jan. 2002, 40(1):96-100.
Thatcher et al., "DNA/RNA Preparation for Molecular Detection," Clinical Chemistry, 2015, 61(1):89-99.

(Continued)

*Primary Examiner* — Jeanine A Goldberg
(74) *Attorney, Agent, or Firm* — DUANE MORRIS LLP

(57) ABSTRACT

The present disclosure provides methods for determining whether a patient exhibiting pertussis-like symptoms will benefit from treatment, with therapeutic agents that inhibit *Bordetella holmesii*. These methods are based on detecting *Bordetella pertussis, Bordetella parapertussis*, and *Bordetella holmesii* in a biological sample by assaying for the presence of the IS481, IS 1001, and hIS1001 target repeat elements, respectively. Kits for use in practicing the methods are also provided.

5 Claims, No Drawings

Specification includes a Sequence Listing.

(56) References Cited

OTHER PUBLICATIONS

Yamamoto et al., "PCR in Diagnosis of Infection: Detection of Bacteria in Cerebrospinal Fluids," Clinical and Diagnostic Laboratory Immunology, May 2002, 9(3):508-514.
Office Action dated Mar. 30, 2023 in CA 3018843.
Huang Jiansheng et al., Hepatitis C, People's Military Medical Press, May 31, 2000, p. 333.
Office Action and Search Report dated Jan. 12, 2022, in CN 201780031481.4, with English translations.

* cited by examiner

METHODS FOR DETECTING *BORDETELLA*

CROSS REFERENCE TO RELATED APPLICATION

This application is the U.S. National Stage of PCT/US2017/023735, filed Mar. 23, 2017, which claims the benefit of and priority to U.S. Application No. 62/312,883 filed Mar. 24, 2016, the contents of which are incorporated herein by reference in their entireties.

The instant application contains a Sequence Listing which has been submitted in ASCII format via EFS-WEB and is hereby incorporated by reference in its entirety. Said ASCII copy, created on Sep. 13, 2018, is named sequence.txt and is 9 KB.

TECHNICAL FIELD

The present disclosure provides methods for determining whether a patient exhibiting pertussis-like symptoms will benefit from treatment with therapeutic agents that inhibit *Bordetella holmesii*. These methods are based on detecting *Bordetella pertussis*, *Bordetella parapertussis*, and *Bordetella holmesii* in a biological sample by assaying for the presence of the IS481, IS1001, and hIS1001 target repeat elements, respectively. Kits for use in practicing the methods are also provided.

BACKGROUND

The following description of the background of the present disclosure is provided simply to aid the reader in understanding the disclosure and is not admitted to describe or constitute prior art to the present disclosure.

*Bordetella pertussis* and *B. parapertussis* commonly cause whooping cough, a highly contagious and acute respiratory illness, in humans. Hoppe J E., *Pediatr Infect Dis J.* 18:375-81 (1999); Mattoo et al., *Clin. Microbiol. Rev.,* 18: 326-382 (2005). Symptoms of whooping cough include episodes of violent cough followed by an inspiratory whoop and sometimes vomiting. In extreme cases whooping cough symptoms can lead to hypoxia, permanent brain damage or even death. In some instances, *B. bronchiseptica* or *B. holmesii* infection can give rise to pertussis-like symptoms.

Diagnosing whooping cough in its early stages can be difficult especially because its symptoms resemble those observed in other common respiratory illnesses, such as bronchitis, a cold, or the flu. Traditionally, bacterial cultures have been used to definitively diagnose whooping cough. Mucus is obtained from the nose and/or throat of the patient and sent to a medical lab for culturing. Although positive results are regarded as conclusive, *Bordetella* cultures typically require 5 to 7 days to obtain a diagnosis. *Bordetella* sp. bacterial cultures are also prone to false negative results because of the fastidious nature of the bacteria.

Antibody assays, including ELISA, are also used to diagnose *Bordetella* sp. by detecting characteristic bacterial antigens. Most commonly, detection of the pertussis toxin protein serves as an indicator of *Bordetella* infection. While these antibody-based assays have good sensitivity and specificity, they typically require a sample of the patient's blood, instead of a non-invasively obtained mucus sample, and require the infection to be in the early and/or convalescent stage. These assays are likely to yield false negative results if the patient sample is not obtained at the appropriate temporal window during disease progression. Other methods for detecting *Bordetella* infection include direct fluorescent antibody (DFA) testing, which is limited by its lack of sensitivity.

Thus, there is a substantial need for more robust and sensitive methods that can rapidly detect and discriminate between multiple related *Bordetella* sp., such as *B. pertussis*, *B. parapertussis*, and *B. holmesii*, in a single biological sample.

SUMMARY

The present disclosure provides compositions and methods for detecting and discriminating between multiple related pathogenic *Bordetella* species (i.e., *B. pertussis*, *B. parapertussis*, and *B. holmesii*) in a biological sample. In another aspect, the methods and compositions of the present technology are useful in selecting an optimal therapeutic regimen for a subject exhibiting pertussis-like symptoms. It is contemplated that the methods disclosed herein allow for rapid, sensitive and simultaneous detection of one or more target nucleic acid sequences corresponding to the IS481, IS1001, and hIS1001 multicopy insertion sequences (IS). Detection of the IS481, IS1001, and hIS1001 repeat elements in a biological sample is useful in determining the presence of *B. pertussis*, *B. parapertussis*, and *B. holmesii* species respectively. In some embodiments, the therapeutic regimen comprises one or more of fluoroquinolones, carbapenems, trimethoprim-sulfamethoxazole, *B. holmesii*-specific antibodies, whole-cell (wP) *B. pertussis* vaccine, acellular *B. pertussis* vaccine, telithromycin and macrolide-antibiotics. The methods of the present technology may be practiced on unprocessed biological samples, resulting in a direct, streamlined sample-to-result process.

Accordingly, in one aspect, the present disclosure provides a method for detecting the presence of at least one pathogenic *Bordetella* species in a biological sample comprising: (a) contacting the biological sample with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof, and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) detecting the presence of at least one pathogenic *Bordetella* species in the biological sample by evaluating the fluorescent signal of each target nucleic acid, whereby (i) *B. holmesii* is detected in the biological sample when a fluorescent signal is detected for the hIS1001 target nucleic acid; (ii) *B. parapertussis* is detected in the biological sample when a fluorescent signal is detected for the IS1001 target nucleic acid; and (iii) *B. pertussis* is detected in the biological sample when a fluorescent signal is detected for the IS481 target nucleic acid and no fluorescent signal is detected for the hIS1001 target nucleic acid, wherein the pathogenic *Bordetella* species is one or more of *B. pertussis*, *B. parapertussis*, and *B. holmesii*; and wherein the biological sample is not subjected to an extraction or purification step prior to amplification. Real-time PCR amplification may be performed in a direct amplification disc in concert with an integrated thermal cycler. The biological sample may comprise a nasopharyngeal (NP) aspirate or wash, nasal swab, or a bacterial isolate.

All primer pairs may be contained together in an amplification master mix further comprising DNA polymerase, dNTPs and PCR buffer prior to contacting with the biological sample. In addition, the amplification master mix may further comprise a fourth primer pair that specifically hybridizes under stringent conditions to a control target nucleic acid.

The biological sample may be brought into contact with one or more of the primer pairs separately or simultaneously. Where the contact occurs simultaneously (i.e. multiplexing), one or more of the first, second, and third primer pairs are brought into contact with the biological sample and with each other to amplify the target nucleic acid sequences.

In some embodiments of the method, the first primer pair consists of a first forward primer comprising 5' CCATAAGCATGCCCGATT 3' (SEQ ID NO: 11) and a first reverse primer comprising 5' CGCTTCAGGCACACAAACT 3'(SEQ ID NO: 10). Additionally or alternatively, in some embodiments, the second primer pair consists of a second forward primer comprising 5' CGGCTCGACGAATTGC 3' (SEQ ID NO: 7) and a second reverse primer comprising 5' AGTTCGTCACGCAGGACAT 3' (SEQ ID NO: 8). In any of the above embodiments, the third primer pair consists of a third forward primer comprising 5' GGCACGGATCGAGGTTTTT 3' (SEQ ID NO: 4) and a third reverse primer comprising 5' TACGGCCGTGAAGTGATAGA 3' (SEQ ID NO: 5).

Optionally, a control nucleic acid and a fourth primer pair complementary to a segment of the control nucleic acid may be included in the amplification mixture. In some embodiments, the control nucleic acid comprises SEQ ID NO: 13. In certain embodiments, the fourth primer pair consists of a fourth forward primer comprising 5' GCTTCAGTACCTTCGGCTTG 3' (SEQ ID NO: 17) and a fourth reverse primer comprising 5' TTGCAGGCATCTCTGACAAC 3' (SEQ ID NO: 18) to generate a control target nucleic acid of SEQ ID NO: 20.

In some embodiments, the method further comprises contacting the biological sample with a first nucleic acid probe that is capable of specifically hybridizing to a segment of the IS481 target nucleic acid of SEQ ID NO: 1, wherein the first nucleic acid probe is detectably labeled and comprises 5' TCAATTGCTGGACCATTTCGAGTCGAC 3' (SEQ ID NO: 12). Additionally or alternatively, in some embodiments, the method further comprises contacting the biological sample with a second nucleic acid probe that is capable of specifically hybridizing to a segment of the complement of the IS1001 target nucleic acid of SEQ ID NO: 2, wherein the second nucleic acid probe is detectably labeled and comprises 5' CAACCAGCCGCTGCTGACGGTC 3' (SEQ ID NO: 9). Additionally or alternatively, in some embodiments, the method further comprises contacting the biological sample with a third nucleic acid probe that is capable of specifically hybridizing to a segment of the hIS1001 target nucleic acid of SEQ ID NO: 3, wherein the third nucleic acid probe is detectably labeled and comprises 5' AGTCGCTGGCTACTGCTGCGCA 3' (SEQ ID NO: 6).

In certain embodiments of the method, the first nucleic acid probe is detectably labelled with the FAM fluorophore, the second nucleic acid probe is detectably labelled with the CFR610 fluorophore, and the third nucleic acid probe is detectably labelled with the JOE fluorophore.

In any of the above embodiments, the method further comprises contacting the biological sample with a fourth nucleic acid probe, wherein the fourth nucleic acid probe is detectably labeled and comprises 5' TGGCTCTTGGCGGTCCAGATG 3' (SEQ ID NO: 19). In some embodiments, the fourth nucleic acid probe is detectably labelled with the Q670 fluorophore.

In another aspect, the present disclosure provides a method for selecting a patient exhibiting pertussis-like symptoms for treatment with a therapeutic agent that inhibits *B. holmesii* comprising: (a) contacting a biological sample obtained from the patient with: (i) a first primer pair that amplifies an IS481 target nucleic acid comprising nucleotides that are at least 85-95% identical to SEQ ID NO: 1 or a complement thereof, (ii) a second primer pair that amplifies an IS1001 target nucleic acid comprising nucleotides that are at least 85-95% identical to SEQ ID NO: 2 or a complement thereof, and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a therapeutic agent that inhibits *B. holmesii*, if a fluorescent signal for the hIS1001 target nucleic acid is detected, wherein the biological sample is not subjected to an extraction or purification step prior to amplification. In some embodiments, real-time PCR amplification is performed in a direct amplification disc in concert with an integrated thermal cycler. The biological sample may comprise a nasopharyngeal (NP) aspirate or wash, nasal swab, or a bacterial isolate.

In some embodiments of the method, the first primer pair consists of a first forward primer comprising 5' CCATAAGCATGCCCGATT 3' (SEQ ID NO: 11) and a first reverse primer comprising 5' CGCTTCAGGCACACAAACT 3'(SEQ ID NO: 10). Additionally or alternatively, in some embodiments, the second primer pair consists of a second forward primer comprising 5' CGGCTCGACGAATTGC 3' (SEQ ID NO: 7) and a second reverse primer comprising 5' AGTTCGTCACGCAGGACAT 3' (SEQ ID NO: 8). In any of the above embodiments, the third primer pair consists of a third forward primer comprising 5' GGCACGGATCGAGGTTTTT 3' (SEQ ID NO: 4) and a third reverse primer comprising 5' TACGGCCGTGAAGTGATAGA 3' (SEQ ID NO: 5).

Optionally, a control nucleic acid and a fourth primer pair complementary to a segment of the control nucleic acid may be included in the amplification mixture. In some embodiments, the control nucleic acid comprises SEQ ID NO: 13. In certain embodiments, the fourth primer pair consists of a fourth forward primer comprising 5' GCTTCAGTACCTTCGGCTTG 3' (SEQ ID NO: 17) and a fourth reverse primer comprising 5' TTGCAGG- CATCTCTGACAAC 3' (SEQ ID NO: 18) to generate a control target nucleic acid of SEQ ID NO: 20.

In some embodiments, the method further comprises contacting the biological sample with a first nucleic acid probe that is capable of specifically hybridizing to a segment of the IS481 target nucleic acid of SEQ ID NO: 1, wherein the first nucleic acid probe is detectably labeled and comprises 5' TCAATTGCTGGACCATTTCGAGTCGAC 3' (SEQ ID NO: 12). Additionally or alternatively, in some embodiments, the method further comprises contacting the biological sample with a second nucleic acid probe that is capable of specifically hybridizing to a segment of the complement of the IS1001 target nucleic acid of SEQ ID NO: 2, wherein the second nucleic acid probe is detectably labeled and comprises 5' CAACCAGCCGCTGCTGACGGTC 3' (SEQ ID NO: 9). Additionally or alternatively, in some embodiments, the method further comprises contacting the biological sample with a third nucleic acid probe that is capable of specifically hybridizing to a segment of the hIS1001 target nucleic acid of SEQ ID NO: 3, wherein the third nucleic acid probe is detectably labeled and comprises 5' AGTCGCTGGC-TACTGCTGCGCA 3' (SEQ ID NO: 6).

In certain embodiments of the method, the first nucleic acid probe is detectably labelled with the FAM fluorophore, the second nucleic acid probe is detectably labelled with the CFR610 fluorophore, and the third nucleic acid probe is detectably labelled with the JOE fluorophore.

In any of the above embodiments, the method further comprises contacting the biological sample with a fourth nucleic acid probe, wherein the fourth nucleic acid probe is detectably labeled and comprises 5' TGGCTCTTGGCGGTCCAGATG 3' (SEQ ID NO: 19). In some embodiments, the fourth nucleic acid probe is detectably labelled with the Q670 fluorophore.

In some embodiments, the therapeutic agent that inhibits B. holmesii is one or more agents selected from the group consisting of fluoroquinolones, carbapenems, trimethoprim-sulfamethoxazole and B. holmesii-specific antibodies. In certain embodiments, the fluoroquinolones are selected from the group consisting of ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin. In some embodiments, the carbapenems are selected from the group consisting of imipenem, meropenem, ertapenem, doripenem, panipenem, biapenem, razupenem (PZ-601), tebipenem, lenapenem, tomopenem, and thienpenem (Thienamycin).

In one aspect, the present disclosure provides a method for selecting a patient exhibiting pertussis-like symptoms for treatment with a B. holmesii-specific antibody and an additional therapeutic agent that inhibits B. parapertussis comprising: (a) contacting a biological sample obtained from the patient with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof; and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a B. holmesii-specific antibody and an additional therapeutic agent if a fluorescent signal for the hIS1001 target nucleic acid and a fluorescent signal for the IS1001 target nucleic acid are detected, wherein the biological sample is not subjected to an extraction or purification step prior to amplification.

In some embodiments, the additional therapeutic agent that inhibits B. parapertussis is one or more agents selected from the group consisting of trimethoprim-sulfamethoxazole, ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin.

In one aspect, the present disclosure provides a method for selecting a patient exhibiting pertussis-like symptoms for treatment with a therapeutic agent that inhibits B. pertussis and an additional therapeutic agent that inhibits B. parapertussis comprising: (a) contacting a biological sample obtained from the patient with: (i) a first primer pair that amplifies an IS481 target nucleic acid comprising nucleotides that are at least 85-95% identical to SEQ ID NO: 1 or a complement thereof, (ii) a second primer pair that amplifies an IS1001 target nucleic acid comprising nucleotides that are at least 85-95% identical to SEQ ID NO: 2 or a complement thereof, and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a therapeutic agent that inhibits B. pertussis and an additional therapeutic agent that inhibits B. parapertussis, if (i) a fluorescent signal for the IS481 target nucleic acid and a fluorescent signal for the IS1001 target nucleic acid are detected, and (ii) no fluorescent signal for the hIS1001 target nucleic acid is detected, wherein the biological sample is not subjected to an extraction or purification step prior to amplification.

In some embodiments of the method, the additional therapeutic agent that inhibits B. parapertussis is one or more agents selected from the group consisting of trimethoprim-sulfamethoxazole, ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin.

In some embodiments of the method, wherein the therapeutic agent that inhibits B. pertussis is one or more agents selected from the group consisting of whole-cell (wP) B. pertussis vaccine, acellular B. pertussis vaccine, telithromycin and macrolide-antibiotics. In certain embodiments, the macrolide-antibiotics are selected from the group consisting of azithromycin (Zithromax), clarithromycin (Biaxin), erythromycin (E-Mycin, Eryc, Ery-Tab, PCE, Pediazole, Ilosone), and roxithromycin.

In another aspect, the present disclosure provides kits comprising oligonucleotides which may be primers or probes for performing amplifications as described herein.

DETAILED DESCRIPTION

The present disclosure provides methods for determining whether a patient exhibiting pertussis-like symptoms will benefit from treatment with therapeutic agents that inhibit *Bordetella holmesii*. These methods are based on detecting *Bordetella pertussis, Bordetella parapertussis*, and *Bordetella holmesii* in a biological sample by assaying for the presence of the IS481, IS1001, and hIS1001 target repeat elements respectively using real-time PCR. The disclosed methods comprise: (a) contacting the biological sample with: (i) a first primer pair that specifically hybridizes to a target nucleic acid sequence of the IS481 repeat element, if present; (ii) a second primer pair that specifically hybridizes to a target nucleic acid sequence of the IS1001 repeat element, if present; and (iii) a third primer pair that specifically hybridizes to a target nucleic acid sequence of the hIS1001 repeat element, if present, to produce a reaction-sample mixture, under conditions where amplification of the IS481, IS1001, and hIS1001 target nucleic acids, if present in the biological sample, occurs without extracting the target nucleic acids from the biological sample; (b) subjecting the reaction-sample mixture to real-time polymerase chain reaction (PCR) conditions under which each of the target nucleic acids present in the biological sample is amplified to produce a fluorescent signal; (c) detecting the amount of fluorescent signal produced by each fluorophore using a an integrated thermal cycling system; and (d) determining the presence of one or more of *Bordetella pertussis, Bordetella parapertussis*, and *Bordetella holmesii* in the biological sample by comparing the amount of fluorescence generated by the target nucleic acids and applying an algorithm disclosed herein. Kits for use in practicing the methods are also provided.

Definitions

Unless otherwise defined, all technical and scientific terms used herein have the same meaning as commonly understood by one of ordinary skill in the art to which the present technology belongs.

As used herein, unless otherwise stated, the singular forms "a," "an," and "the" include plural reference. Thus, for example, a reference to "an oligonucleotide" includes a plurality of oligonucleotide molecules, and a reference to "a nucleic acid" is a reference to one or more nucleic acids.

As used herein, the term "about" in reference to a number is generally taken to include numbers that fall within a range of 1%-10% in either direction (greater than or less than) of the number unless otherwise stated or otherwise evident from the context.

As used herein, the terms "amplify" or "amplification" with respect to nucleic acid sequences, refer to methods that increase the representation of a population of nucleic acid sequences in a sample. Copies of a particular target nucleic acid sequence generated in vitro in an amplification reaction are called "amplicons" or "amplification products". Amplification may be exponential or linear. A target nucleic acid may be DNA (such as, for example, genomic DNA and cDNA) or RNA. While the exemplary methods described hereinafter relate to amplification using polymerase chain reaction (PCR), numerous other methods such as isothermal methods, rolling circle methods, etc., are well known to the skilled artisan. The skilled artisan will understand that these other methods may be used either in place of, or together with, PCR methods. See, e.g., Saiki, "*Amplification of Genomic DNA*" in PCR Protocols, Innis et al., Eds., Academic Press, San Diego, CA 1990, pp 13-20; Wharam, et al., *Nucleic Acids Res.* 29(11):E54-E54 (2001).

An "amplification mixture" as used herein is a mixture of reagents that are used in a nucleic acid amplification reaction, but does not contain primers or sample. An amplification mixture comprises a buffer, dNTPs, and a DNA polymerase. An amplification mixture may further comprise at least one of $MgCl_2$, KCl, nonionic and ionic detergents (including cationic detergents).

An "amplification master mix" comprises an amplification mixture and primers for amplifying one or more target nucleic acids, but does not contain the sample to be amplified.

The terms "complement", "complementary" or "complementarity" as used herein with reference to polynucleotides (i.e., a sequence of nucleotides such as an oligonucleotide or a target nucleic acid) refer to the Watson/Crick base-pairing rules. The complement of a nucleic acid sequence as used herein refers to an oligonucleotide which, when aligned with the nucleic acid sequence such that the 5' end of one sequence is paired with the 3' end of the other, is in "antiparallel association." For example, the sequence "5'-A-G-T-3'" is complementary to the sequence "3'-T-C-A-5'." Certain bases not commonly found in naturally-occurring nucleic acids may be included in the nucleic acids described herein. These include, for example, inosine, 7-deazaguanine, Locked Nucleic Acids (LNA), and Peptide Nucleic Acids (PNA). Complementarity need not be perfect; stable duplexes may contain mismatched base pairs, degenerative, or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs. A complement sequence can also be an RNA sequence complementary to the DNA sequence or its complement sequence, and can also be a cDNA.

The term "substantially complementary" as used herein means that two sequences hybridize under stringent hybridization conditions. The skilled artisan will understand that substantially complementary sequences need not hybridize along their entire length. In particular, substantially complementary sequences may comprise a contiguous sequence of bases that do not hybridize to a target sequence, positioned 3' or 5' to a contiguous sequence of bases that hybridize under stringent hybridization conditions to a target sequence.

As used herein, a "cycle threshold" (Ct) for an analyte is the PCR cycle at which the fluorescence signal crosses a specified fluorescence threshold. The Ct depends on the amplification reaction efficiency which includes starting template copy number, organism lysis, PCR amplification, hybridization or cleavage of a fluorogenic probe and sensitivity of detection. The Ct provides a relative measure of the concentration of the target nucleic acid in the PCR reaction. Many factors other than the concentration of the target nucleic acid can impact the absolute value of Ct. However, artifacts from the reaction mix or instrument that change the fluorescence measurements associated with the Ct calculation will result in template-independent changes to the Ct value.

As used herein, the term "detecting" refers to determining the presence of a target nucleic acid in the sample. Detection does not require the method to provide 100% sensitivity and/or 100% specificity.

As used herein, the term "direct amplification" refers to a nucleic acid amplification reaction in which the target nucleic acid is amplified from the sample without prior purification, extraction, or concentration.

As used herein, the term "extraction" refers to any action taken to remove nucleic acids from other (non-nucleic acid) material present in the sample. The term extraction includes mechanical or chemical lysis, addition of detergent or protease, or precipitation and removal of non-nucleic acids such as proteins.

The term "fluorophore" as used herein refers to a molecule that absorbs light at a particular wavelength (excitation frequency) and subsequently emits light of a longer wavelength (emission frequency). The term "donor fluorophore" as used herein means a fluorophore that, when in close proximity to a quencher moiety, donates or transfers emission energy to the quencher. As a result of donating energy to the quencher moiety, the donor fluorophore will itself emit less light at a particular emission frequency that it would have in the absence of a closely positioned quencher moiety.

The term "hybridize" as used herein refers to a process where two substantially complementary nucleic acid strands (at least about 65% complementary over a stretch of at least 14 to 25 nucleotides, at least about 75%, or at least about 90% complementary) anneal to each other under appropriately stringent conditions to form a duplex or heteroduplex through formation of hydrogen bonds between complementary base pairs. Hybridizations are typically and preferably conducted with probe-length nucleic acid molecules, preferably 15-100 nucleotides in length, more preferably 18-50 nucleotides in length. Nucleic acid hybridization techniques are well known in the art. See, e.g., Sambrook, et al., 1989, *Molecular Cloning: A Laboratory Manual*, Second Edition, Cold Spring Harbor Press, Plainview, N.Y. Hybridization and the strength of hybridization (i.e., the strength of the association between the nucleic acids) is influenced by such factors as the degree of complementarity between the nucleic acids, stringency of the conditions involved, and the thermal melting point ($T_m$) of the formed hybrid. Those skilled in the art understand how to estimate and adjust the stringency of hybridization conditions such that sequences having at least a desired level of complementarity will stably hybridize, while those having lower complementarity will not. For examples of hybridization conditions and parameters, see, e.g., Sambrook, et al., 1989, *Molecular Cloning: A Laboratory Manual*, Second Edition, Cold Spring Harbor Press, Plainview, N.Y.; Ausubel, F. M. et al. 1994, *Current Protocols in Molecular Biology*, John Wiley & Sons, Secaucus, N.J. In some embodiments, specific hybridization occurs under stringent hybridization conditions. An oligonucleotide or polynucleotide (e.g., a probe or a primer) that is specific for a target nucleic acid will "hybridize" to the target nucleic acid under suitable conditions.

As used herein, the terms "individual", "patient", or "subject" can be an individual organism, a vertebrate, a mammal, or a human. In a preferred embodiment, the individual, patient or subject is a human.

As used herein, the term "multiplex PCR" refers to the simultaneous generation of two or more PCR products or amplicons within the same reaction vessel. Each PCR product is primed using a distinct primer pair. A multiplex reaction may further include specific probes for each product that are labeled with different detectable moieties.

As used herein, "oligonucleotide" refers to a molecule that has a sequence of nucleic acid bases on a backbone comprised mainly of identical monomer units at defined intervals. The bases are arranged on the backbone in such a way that they can bind with a nucleic acid having a sequence of bases that are complementary to the bases of the oligonucleotide. The most common oligonucleotides have a backbone of sugar phosphate units. A distinction may be made between oligodeoxyribonucleotides that do not have a hydroxyl group at the 2' position and oligoribonucleotides that have a hydroxyl group at the 2' position. Oligonucleotides may also include derivatives, in which the hydrogen of the hydroxyl group is replaced with organic groups, e.g., an allyl group. Oligonucleotides that function as primers or probes are generally at least about 10-15 nucleotides in length or up to about 70, 100, 110, 150 or 200 nucleotides in length, and more preferably at least about 15 to 25 nucleotides in length. Oligonucleotides used as primers or probes for specifically amplifying or specifically detecting a particular target nucleic acid generally are capable of specifically hybridizing to the target nucleic acid.

As used herein, a "pathogenic *Bordetella* species" refers to any microbial organism of the *Bordetella* genus that is capable of causing whooping cough or a related condition in a subject (e.g., a human). Specific pathogens include, for example, *B. pertussis*, *B. parapertussis*, or *B. holmesii*.

A "positive control nucleic acid" or "internal positive amplification control" as used herein is a nucleic acid known to be present in a sample at a certain amount or level. In some embodiments, a positive control nucleic acid is not naturally present in a sample and is added to the sample prior to subjecting the reaction-sample mixture to real-time polymerase chain reaction in the disclosed methods for detecting the presence of pathogenic *Bordetella* species in a sample.

As used herein, the term "primer" refers to an oligonucleotide, which is capable of acting as a point of initiation of nucleic acid sequence synthesis when placed under conditions in which synthesis of a primer extension product which is complementary to a target nucleic acid strand is induced, i.e., in the presence of different nucleotide triphosphates and a polymerase in an appropriate buffer ("buffer" includes pH, ionic strength, cofactors etc.) and at a suitable temperature. One or more of the nucleotides of the primer can be modified for instance by addition of a methyl group, a biotin or digoxigenin moiety, a fluorescent tag or by using radioactive nucleotides. A primer sequence need not reflect the exact sequence of the template. For example, a non-complementary nucleotide fragment may be attached to the 5' end of the primer, with the remainder of the primer sequence being substantially complementary to the strand. The term primer as used herein includes all forms of primers that may be synthesized including peptide nucleic acid primers, locked nucleic acid primers, phosphorothioate modified primers, labeled primers, and the like. The term "forward primer" as used herein means a primer that anneals to the anti-sense strand of double-stranded DNA (dsDNA). A "reverse primer" anneals to the sense-strand of dsDNA.

Primers are typically at least 10, 15, 18, or 30 nucleotides in length or up to about 100, 110, 125, or 200 nucleotides in length. In some embodiments, primers are preferably between about 15 to about 60 nucleotides in length, and most preferably between about 25 to about 40 nucleotides in length. In some embodiments, primers are 15 to 35 nucleotides in length. There is no standard length for optimal hybridization or polymerase chain reaction amplification. An optimal length for a particular primer application may be readily determined in the manner described in H. Erlich, *PCR Technology*, PRINCIPLES AND APPLICATION FOR DNA AMPLIFICATION, (1989).

A "primer extension reaction" refers to a synthetic reaction in which an oligonucleotide primer hybridizes to a target nucleic acid and a complementary copy of the target nucleic acid is produced by the polymerase-dependent 3'-addition of individual complementary nucleotides. In some embodiments, the primer extension reaction is PCR.

As used herein, the term "primer pair" refers to a forward and reverse primer pair (i.e., a left and right primer pair) that can be used together to amplify a given region of a nucleic acid of interest.

"Probe" as used herein refers to nucleic acid that interacts with a target nucleic acid via hybridization. A probe may be fully complementary to a target nucleic acid sequence or partially complementary. The level of complementarity will depend on many factors based, in general, on the function of the probe. Probes can be labeled or unlabeled, or modified in any of a number of ways well known in the art. A probe may specifically hybridize to a target nucleic acid. Probes may be DNA, RNA or a RNA/DNA hybrid. Probes may be oligonucleotides, artificial chromosomes, fragmented artificial chromosome, genomic nucleic acid, fragmented genomic nucleic acid, RNA, recombinant nucleic acid, fragmented recombinant nucleic acid, peptide nucleic acid (PNA), locked nucleic acid, oligomer of cyclic heterocycles, or conjugates of nucleic acid. Probes may comprise modified nucleobases, modified sugar moieties, and modified internucleotide linkages. A probe may be used to detect the presence or absence of a methylated target nucleic acid. Probes are typically at least about 10, 15, 20, 25, 30, 35, 40, 50, 60, 75, 100 nucleotides or more in length.

A "probe element" as used herein refers to a stretch of nucleotides that (a) is associated with a primer in that it is connected to or located adjacent to the primer nucleic acid sequence, and (b) specifically hybridizes under stringent conditions to a target nucleic acid sequence to be detected.

As used herein, the term "primer-probe detection system" refers to a method for real-time PCR. This method utilizes a bi-functional molecule (referred to herein as a primer-probe), which contains a PCR primer element covalently linked by a polymerase-blocking group to a probe element. Additionally, each primer-probe molecule contains a fluorophore that interacts with a quencher to reduce the background fluorescence. Primer-probes, as used herein, may comprise a 3' primer with a 5' extended probe tail comprising a hairpin structure which possesses a fluorophore/quencher pair. During PCR, the polymerase is blocked from extending into the probe tail by the inclusion of hexethylene glycol (HEG). During the first round of amplification the 3' target-specific primer anneals to the target nucleic acid and is extended such that the primer-probe is now incorporated into the newly synthesized strand, which possesses a newly synthesized target region for the 5' probe. During the next round of denaturation and annealing, the probe region of the primer-probe hairpin loop will hybridize to the target, thus separating the fluorophore and quencher and creating a measurable signal. Such primer-probes are described in Whitcombe et al., *Nature Biotech* 17: 804-807 (1999). SCORPION primers are exemplary primer-probes.

The term "quencher moiety" as used herein means a molecule that, in close proximity to a donor fluorophore, takes up emission energy generated by the donor and either dissipates the energy as heat or emits light of a longer wavelength than the emission wavelength of the donor. In the latter case, the quencher is considered to be an acceptor fluorophore. The quenching moiety can act via proximal (i.e., collisional) quenching or by Förster or fluorescence resonance energy transfer ("FRET"). Quenching by FRET is generally used in TaqMan® probes while proximal quenching is used in molecular beacon and Scorpion™ type probes.

A "reaction-sample mixture" as used herein refers to a mixture containing amplification master mix and a sample.

As used herein, the term "sample" refers to clinical samples obtained from a patient or isolated microorganisms. In preferred embodiments, a sample is obtained from a biological source (i.e., a "biological sample"), such as tissue, bodily fluid, or microorganisms collected from a subject. Sample sources include, but are not limited to, mucus, sputum (processed or unprocessed), bronchial alveolar lavage (BAL), bronchial wash (BW), blood, bodily fluids, cerebrospinal fluid (CSF), urine, plasma, serum, or tissue (e.g., biopsy material). Preferred sample sources include nasopharyngeal and/or throat swabs or nasal washes.

The term "sensitivity," as used herein in reference to the methods of the present technology, is a measure of the ability of a method to detect a preselected sequence variant in a heterogeneous population of sequences. A method has a sensitivity of S % for variants of F % if, given a sample in which the preselected sequence variant is present as at least F % of the sequences in the sample, the method can detect the preselected sequence at a preselected confidence of C %, S % of the time. By way of example, a method has a sensitivity of 90% for variants of 5% if, given a sample in which the preselected variant sequence is present as at least 5% of the sequences in the sample, the method can detect the preselected sequence at a preselected confidence of 99%, 9 out of 10 times (F=5%; C=99%; S=90%). Exemplary sensitivities include at least 50, 60, 70, 80, 90, 95, 98, and 99%.

The term "specific" as used herein in reference to an oligonucleotide primer means that the nucleotide sequence of the primer has at least 12 bases of sequence identity with a portion of the nucleic acid to be amplified when the oligonucleotide and the nucleic acid are aligned. An oligonucleotide primer that is specific for a nucleic acid is one that, under the stringent hybridization or washing conditions, is capable of hybridizing to the target of interest and not substantially hybridizing to nucleic acids which are not of interest. Higher levels of sequence identity are preferred and include at least 75%, at least 80%, at least 85%, at least 90%, at least 85-95% and more preferably at least 98% sequence identity. Sequence identity can be determined using a commercially available computer program with a default setting that employs algorithms well known in the art. As used herein, sequences that have "high sequence identity" have identical nucleotides at least at about 50% of aligned nucleotide positions, preferably at least at about 60% of aligned nucleotide positions, and more preferably at least at about 75% of aligned nucleotide positions.

"Specificity," as used herein, is a measure of the ability of a method to distinguish a truly occurring preselected sequence variant from sequencing artifacts or other closely related sequences. It is the ability to avoid false positive detections. False positive detections can arise from errors introduced into the sequence of interest during sample preparation, sequencing error, or inadvertent sequencing of closely related sequences like pseudo-genes or members of a gene family. A method has a specificity of X % if, when applied to a sample set of $N_{Total}$ sequences, in which $X_{True}$ sequences are truly variant and $X_{Not\ true}$ are not truly variant, the method selects at least X % of the not truly variant as not variant. E.g., a method has a specificity of 90% if, when applied to a sample set of 1,000 sequences, in which 500 sequences are truly variant and 500 are not truly variant, the method selects 90% of the 500 not truly variant sequences as not variant. Exemplary specificities include at least 50, 60, 70, 80, 90, 95, 98, and 99%.

The term "stringent hybridization conditions" as used herein refers to hybridization conditions at least as stringent as the following: hybridization in 50% formamide, 5×SSC, 50 mM NaH$_2$PO4, pH 6.8, 0.5% SDS, 0.1 mg/mL sonicated salmon sperm DNA, and 5×Denhart's solution at 42° C. overnight; washing with 2×SSC, 0.1% SDS at 45° C.; and washing with 0.2×SSC, 0.1% SDS at 45° C. In another example, stringent hybridization conditions should not allow for hybridization of two nucleic acids which differ over a stretch of 20 contiguous nucleotides by more than two bases.

As used herein "TaqMan® PCR detection system" refers to a method for real-time PCR. In this method, a TaqMan® probe which hybridizes to the amplified nucleic acid segment is included in the amplification master mix. The TaqMan® probe comprises a donor and a quencher fluorophore on either end of the probe and in close enough proximity to each other so that the fluorescence of the donor is taken up by the quencher. However, when the probe hybridizes to the amplified segment, the 5'-exonuclease activity of the Taq polymerase cleaves the probe thereby allowing the donor fluorophore to emit fluorescence which can be detected.

The terms "target nucleic acid" or "target sequence" as used herein refer to a nucleic acid sequence of interest to be detected and/or quantified in the sample to be analyzed. Target nucleic acid may be composed of segments of a chromosome, a complete gene with or without intergenic sequence, segments or portions of a gene with or without intergenic sequence, or sequence of nucleic acids which probes or primers are designed. Target nucleic acids may include a wild-type sequence(s), a mutation, deletion, insertion or duplication, tandem repeat elements, a gene of interest, a region of a gene of interest or any upstream or downstream region thereof. Target nucleic acids may represent alternative sequences or alleles of a particular gene. Target nucleic acids may be derived from genomic DNA, cDNA, or RNA.

Impact of *Bordetella* Species Profiling on Therapy Selection

Pertussis continues to be a significant cause of morbidity and infant mortality worldwide. World Health Organization, *Wkly. Epidemiol. Rec.* 80:31-38 (2005). Despite the availability of *B. pertussis* vaccines, the reported incidence of whooping cough in industrialized countries has been on the rise for the past 20 years. The increased incidence of pertussis has been attributed to several factors including waning immunity, increased public health awareness and reporting, and use of more sensitive diagnostics such as PCR-based assays.

Some studies have shown an increase in the incidence of *B. parapertussis*-induced respiratory illness. Watanabe, M. et al., *Expert Rev. Anti Infect. Ther.* 2:447-454 (2004). Moreover, pertussis-like illness due to *B. holmesii* occurs in the United States. Weber, D. J. et al., *Infect. Control Hosp. Epidemiol.* 31:875-877 (2010). Further, *B. bronchiseptica* is occasionally isolated from the upper respiratory tract of immunocompromised individuals. Wemli, D. et al., *Clin. Microbiol. Infect.* 17:201-203 (2010). Therefore, species identification and confirmation of *Bordetella* species must occur to allow an accurate diagnosis and management of pertussis and pertussis-like diseases in humans.

The multicopy insertion sequence IS481 is often utilized as a target nucleic acid sequence in real-time PCR assays for detecting *B. pertussis* infection because the *B. pertussis* genome typically contains about 50-200 copies of IS481, making this assay highly sensitive. However, single analyte PCR assays that only target IS481 can yield false positive results for pertussis because IS481 is also found in *B. holmesii* (8 to 10 copies per genome), and in animal isolates of *B. bronchiseptica*. Register, K. et al., *J. Clin. Microbiol.* 44:4577-4583 (2006); Reischl, U. et al., *J Clin. Microbiol.* 39:1963-1966 (2001). Pseudo-outbreaks due to false-positive results of assays using IS481 as a single PCR target have demonstrated the need for defined cutoff values based on analytical sensitivity and clinical relevance. Lievano, F. A., et al., *J Clin. Microbiol.* 40:2801-2805 (2002); Muyldermans, G., et al., *J Clin. Microbiol.* 43:30-35 (2005).

Accurate identification of *B. holmesii* is important for several reasons. Unlike *B. pertussis, B. holmesii* can cause invasive diseases in both immunocompromised and immunocompetent subjects. Tartof S Y et al., *Clin Infect Dis* 58: e39-43 (2014); Jonckheere et al., *J Med Microbiol* 61: 874-877 (2012); Russell F M et al., *Clin Infect Dis* 33: 129-130 (2001). Studies show that neither whole-cell (wP) nor acellular (aP) *B. pertussis* vaccines confer therapeutic protection against *B. holmesii* infection in mice. Zhang et al., *Emerging Infectious Diseases* 18(11):1771-1779 (2012). In humans, the estimated effectiveness of the adolescent acellular pertussis booster vaccination against *B. holmesii* during a pertussis outbreak in Ohio (USA) was 36% compared with 67% against *B. pertussis*. Rodgers L et al., *Clin Infect Dis* 56: 322-331 (2013). Therefore, immunized patients are likely not protected against *B. holmesii* infection. Further, subsequent misdiagnosing of *B. holmesii* for *B. pertussis* could be misconstrued as vaccine failure, which could lead to inappropriate public health measures. Additionally, it is unclear at this time if prophylactic antibiotic treatment of all contacts of index cases, such as in *B. pertussis* infection, is necessary for *B. holmesii* infection. Weber D J et al., *Infect Control and Hosp Epidemiol* 31: 306-307 (2010). Accordingly, a high degree of specificity is needed in *Bordetella* screening assays to avoid unnecessary or inappropriate therapeutic interventions.

The present disclosure provides a sensitive and specific real-time multiplex PCR assay that simultaneously targets the IS481, *B. parapertussis* IS1001, and *B. holmesii* hIS1001 repeat elements, thus permitting the rapid identification of one or more pathogenic *Bordetella* species in a biological sample.

Biological Sample Collection and Preparation

The methods and compositions of the present technology are useful in detecting pathogenic *Bordetella* species by assaying for target nucleic acid sequences corresponding to the IS481, IS1001, and hIS1001 multicopy insertion sequences in a biological sample obtained from a subject. Samples for pathogenic *Bordetella* species detection may also comprise cultures of bacterial isolates grown on appropriate media to form colonies, wherein the cultures were prepared from a biological sample obtained from a subject.

The methods disclosed herein are useful in detecting and quantifying pathogenic *Bordetella* species in biological samples derived from sterile and/or non-sterile sites. "Sterile sites" include body fluids such as whole blood, plasma, cell free plasma, urine, cerebrospinal fluid, synovial fluid, pleural fluid, pericardial fluid, intraocular fluid, tissue biopsies or endrotracheal aspirates. As used herein, "cell-free plasma" refers to plasma containing less than 1% cells by volume. "Non-sterile sites" include sputum, stool, skin swabs, inguinal swabs, nasal swabs and throat swabs. In some embodiments, the biological samples comprise nasopharyngeal (NP) aspirates or swabs or nasal washes. In other embodiments, the biological samples comprise cultures of isolated bacteria grown on appropriate media to form colonies. Samples may also include bacterial isolates.

A biological sample may be suspected of containing pathogenic *Bordetella* species and/or nucleic acids of one or more pathogenic *Bordetella* species. In addition, a biological sample may be obtained from a subject suspected of being infected with one or more pathogenic *Bordetella* species. The biological sample may be contacted with an amplification master mix for use in a microfluidic/microelectronic centrifugation platform.

Although the disclosed methods preferably employ unprocessed biological samples thus resulting in a direct, streamlined sample-to-result process, the detection methods disclosed herein will be effective if used on isolated nucleic acid (DNA or RNA) purified from a biological sample according to any methods well known to those of skill in the art. If desired, the sample may be collected or concentrated by centrifugation and the like. The cells of the sample may be subjected to lysis, such as by treatments with enzymes, heat surfactants, ultrasonication or a combination thereof. Alternatively, a biological sample may be processed using a commercially available nucleic acid extraction kit.

In some embodiments, one or more primer pairs are present in an amplification master mix that further comprises DNA polymerase, dNTPs and PCR buffer prior to contact with the biological sample. Amplification of the IS481, IS1001, and hIS1001 target repeat elements preferably occurs in a multiplex format. Alternatively, individual PCR reactions for each multicopy insertion sequence may also be used. The biological sample may be contacted with the primer pair(s) and/or with an amplification master mix to form a reaction-sample mixture in a direct amplification disc. For example, the biological sample may be contacted with the amplification master mix in a direct amplification disc such as the Direct Amplification Disc marketed by Focus Diagnostics, Inc. (Cypress, Calif., USA) as part of the SIMPLEXA Direct real-time PCR assays to work in concert with the 3M™ Integrated Cycler. A direct amplification disc is a thin, circular disc containing multiple designated regions, each of which contains a well for receiving an amplification master mix and an associated well for receiving unprocessed patient sample. The sample-reaction mixture is produced in the direct amplification disc upon or after addition of the amplification master mix and the sample.

Real-Time PCR

Amplification of target nucleic acids can be detected by any of a number of methods well-known in the art such as gel electrophoresis, column chromatography, hybridization with a probe, sequencing, melting curve analysis, or "real-time" detection.

For real-time detection, primers and/or probes may be detectably labeled to allow differences in fluorescence when the primers become incorporated or when the probes are hybridized, for example, and amplified in an instrument capable of monitoring the change in fluorescence during the reaction. Real-time detection methods for nucleic acid amplification are well known and include, for example, the TaqMan® system, Scorpion™ primer system and use of intercalating dyes for double-stranded nucleic acid.

In real-time quantitative PCR, the accumulation of amplification product is measured continuously in both standard dilutions of target DNA and samples containing unknown amounts of target DNA. A standard curve is constructed by correlating initial template concentration in the standard samples with the number of PCR™ cycles (Ct) necessary to produce a specific threshold concentration of product. In the test samples, target PCR™ product accumulation is measured after the same Ct, which allows interpolation of target DNA concentration from the standard curve.

In some embodiments, amplified nucleic acids are detected by hybridization with a specific probe. Probe oligonucleotides, complementary to a portion of the amplified target sequence may be used to detect amplified fragments. In some embodiments, hybridization may be detected in real time. In an alternate embodiment, hybridization is not detected in real time. Amplified nucleic acids for each of the target sequences may be detected simultaneously (i.e., in the same reaction vessel such as multiplex PCR) or individually (i.e., in separate reaction vessels). In certain embodiments, multiple target nucleic acids are detected simultaneously, using two or more distinguishably-labeled (e.g., via different detectable moieties such as color), gene-specific oligonucleotide probes, one which hybridizes to the first target sequence and the other which hybridizes to the second target sequence.

In some embodiments, the different primer pairs are labeled with different distinguishable detectable moieties. Thus, for example, HEX and FAM fluorescent dyes may be present on different primer pairs in the multiplex PCR and associated with the resulting amplicons. In other embodiments, the forward primer is labeled with one detectable moiety, while the reverse primer is labeled with a different detectable moiety, e.g. FAM dye for a forward primer and HEX dye for a reverse primer. Use of different detectable moieties is useful for discriminating between amplified products which are of the same length or are very similar in length.

For sequence-modified nucleic acids, the target may be independently selected from the top strand or the bottom strand. Thus, all targets to be detected may comprise top strand, bottom strand, or a combination of top strand and bottom strand targets.

One general method for real-time PCR uses fluorescent probes such as the TaqMan® probes, molecular beacons, and Scorpion primer-probes. Real-time PCR quantifies the initial amount of the template with more specificity, sensitivity and reproducibility, than other forms of quantitative PCR, which detect the amount of final amplified product. Real-time PCR does not detect the size of the amplicon. The probes employed in Scorpion™ and TaqMan® technologies are based on the principle of fluorescence quenching and involve a donor fluorophore and a quenching moiety.

Real-time PCR is performed using any suitable instrument capable of detecting the accumulation of the PCR amplification product. Most commonly, the instrument is capable of detecting fluorescence from one or more fluorescent labels. For example, real-time detection on the instrument (e.g., an ABI Real-Time PCR System 7500® sequence detector) monitors fluorescence and calculates the measure of reporter signal, or Rn value, during each PCR cycle. The threshold cycle, or Ct value, is the cycle at which fluorescence intersects the threshold value. The threshold value can be determined by the sequence detection system software or manually.

In some embodiments, the probes employed are detectably labeled and the detecting is accomplished by detecting the probe label for each amplification product. A quencher may further be associated with the detectable label which prevents detection of the label prior to amplification of the probe's target. TaqMan® probes are examples of such probes.

TaqMan® probes (Heid et al., *Genome Res.* 6: 986-994, 1996) use the fluorogenic 5' exonuclease activity of Taq polymerase to measure the amount of target sequences in DNA samples. TaqMan® probes are oligonucleotides that contain a donor fluorophore usually at or near the 5' base, and a quenching moiety typically at or near the 3' base. The quencher moiety may be a dye such as TAMRA or may be a non-fluorescent molecule such as 4-(4-dimethylaminophenylazo) benzoic acid (DABCYL). See Tyagi et al., 16 Nature Biotechnology 49-53 (1998). When irradiated, the excited fluorescent donor transfers energy to the nearby quenching moiety by FRET rather than fluorescing. Thus, the close proximity of the donor and quencher prevents emission of donor fluorescence while the probe is intact.

TaqMan® probes are designed to anneal to an internal region of a PCR product. When the polymerase replicates a template on which a TaqMan® probe is bound, its 5' exonuclease activity cleaves the probe. This terminates the activity of the quencher (no FRET) and the donor fluorophore starts to emit fluorescence which increases in each cycle proportional to the rate of probe cleavage. Accumulation of PCR product is detected by monitoring the increase in fluorescence of the reporter dye. If the quencher is an acceptor fluorophore, then accumulation of PCR product can be detected by monitoring the decrease in fluorescence of the acceptor fluorophore.

In certain embodiments, real-time PCR is performed using a bifunctional primer-probe detection system (e.g., Scorpion™ primers). With Scorpion primers, sequence-specific priming and PCR product detection is achieved using a single molecule. The Scorpion primer maintains a stem-loop configuration in the unhybridized state. The fluorophore is attached to the 5' end and is quenched by a moiety coupled to the 3' end, although in certain embodiments, this arrangement may be switched. The 3' portion of the stem and/or loop also contains sequence that is complementary to the extension product of the primer and is linked to the 5' end of a specific primer via a non-amplifiable monomer. After extension of the primer moiety, the specific probe sequence is able to bind to its complement within the extended amplicon, thus opening up the hairpin loop. This prevents the fluorescence from being quenched and a signal is observed. A specific target is amplified by the reverse primer and the primer portion of the Scorpion™ primer, resulting in an extension product. A fluorescent signal is generated due to the separation of the fluorophore from the quencher resulting from the binding of the probe element of the Scorpion™ primer to the extension product.

In some embodiments, the probes employed in the disclosed methods comprise or consist of short fluorescently labeled DNA sequences designed to detect sections of DNA sequence with a genetic variation such as those disclosed in French et al., *Mol Cell Probes*, 5(6):363-74 (2001), incorporated by reference herein in its entirety. HyBeacons® are an example of this type of probe.

In some embodiments of the method, at least one primer of each primer pair or at least one probe in the amplification reaction comprises a detectable moiety. Alternatively, the detectable moiety may be on a probe that is attached to the primer, such as with a primer-probe. In some embodiments, the detectable moiety or label is a fluorophore. Suitable fluorescent moieties include, but are not limited to the following fluorophores: 4-acetamido-4'-isothiocyanatostilbene-2,2'disulfonic acid, acridine and derivatives (acridine, acridine isothiocyanate), Alexa Fluors (Alexa Fluor® 350, Alexa Fluor® 488, Alexa Fluor® 546, Alexa Fluor® 555, Alexa Fluor® 568, Alexa Fluor® 594, Alexa Fluor® 647 (Molecular Probes)), 5-(2'-aminoethyl)aminonaphthalene-1-sulfonic acid (EDANS), 4-amino-N-[3-vinylsulfonyl)phenyl]naphthalimide-3,5 disulfonate (*Lucifer* Yellow VS), N-(4-anilino-1-naphthyl)maleimide, anthranilamide, BODIPY® R-6G, BOPIPY® 530/550, BODIPY® FL, Brilliant Yellow, Cal Fluor Red 610® (CFR610), coumarin and derivatives (coumarin, 7-amino-4-methylcoumarin (AMC, Coumarin 120), 7-amino-4-trifluoromethylcoularin (Coumarin 151)), Cy2®, Cy3®, Cy3.5®, Cy5®, Cy5.5®, cyanosine, 4',6-diaminidino-2-phenylindole (DAPI), 5', 5"-dibromopyrogallol-sulfonephthalein (Bromopyrogallol Red), 7-diethylamino-3-(4'-isothiocyanatophenyl)-4-methylcoumarin, diethylenetriamine pentaacetate, 4,4'-diisothiocyanatodihydro-stilbene-2,2'-disulfonic acid, 4,4'-diisothiocyanatostilbene-2,2'-disulfonic acid, 5-[dimethylamino] naphthalene-1-sulfonyl chloride (DNS, dansyl chloride), 4-(4'-dimethylaminophenylazo)benzoic acid (DABCYL), 4-dimethylaminophenylazophenyl-4'-isothiocyanate (DABITC), Eclipse™ (Epoch Biosciences Inc.), eosin and derivatives (eosin, eosin isothiocyanate), erythrosin and derivatives (erythrosin B, erythrosin isothiocyanate), ethidium, fluorescein and derivatives (5-carboxyfluorescein (FAM), 5-(4,6-dichlorotriazin-2-yl)aminofluorescein (DTAF), 2',7'-dimethoxy-4'5'-dichloro-6-carboxyfluorescein (JOE), fluorescein, fluorescein isothiocyanate (FITC), hexachloro-6-carboxyfluorescein (HEX), QFITC (XRITC), tetrachlorofluorescein (TET), fluorescamine, IR144, IR1446, lanthamide phosphors, Malachite Green isothiocyanate, 4-methylumbelliferone, ortho cresolphthalein, nitrotyrosine, pararosaniline, Phenol Red, B-phycoerythrin, R-phycoerythrin, allophycocyanin, o-phthaldialdehyde, Oregon Green®, propidium iodide, pyrene and derivatives (pyrene, pyrene butyrate, succinimidyl 1-pyrene butyrate), QSY® 7, QSY® 9, QSY® 21, QSY® 35 (Molecular Probes), Reactive Red 4 (Cibacron® Brilliant Red 3B-A), rhodamine and derivatives (6-carboxy-X-rhodamine (ROX), 6-carboxyrhodamine (R6G), lissamine rhodamine B sulfonyl chloride, rhodamine (Rhod), rhodamine B, rhodamine 123, rhodamine green, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, tetramethyl rhodamine isothiocyanate (TRITC), riboflavin, rosolic acid, terbium chelate derivatives, Quasar 670®, and VIC®.

Suitable quenchers are selected based on the fluorescence spectrum of the particular fluorophore. Useful quenchers include, for example, the Black Hole™ quenchers BHQ-1, BHQ 2, and BHQ-3 (Biosearch Technologies, Inc.), and the ATTO-series of quenchers (ATTO 540Q, ATTO 580Q, and ATTO 612Q; Atto-Tec GmbH).

In some embodiments of the method, the reaction-sample mixture is subjected to real-time polymerase chain reaction (PCR) conditions under which each of the target nucleic acids present in the biological sample is amplified and the amplified product(s) are detected and measured. In some embodiments, the biological sample is loaded directly into a direct amplification disc without a separate, front-end specimen preparation, followed by Real-time PCR detection and differentiation of target analytes in the same disc. In certain embodiments, the amplification is performed in a Direct Amplification Disc (an 8-well disc from Focus Diagnostics, Inc.). In some embodiments, real-time PCR amplification is performed using the SIMPLEXA Direct assay in a direct amplification disc and detection is performed using an integrated thermal cycler such as the 3M™ Integrated Cycler sold by 3M (St. Paul, Minn., USA). The 3M™ Integrated Cycler can receive a Direct Amplification Disc and is capable of performing multiple assays per disc. This apparatus can heat at >5° C. per second and cool at >4° C.

per second. Cycling parameters can be varied, depending on the length of the amplification products to be extended. In certain embodiments, an internal positive amplification control (IPC) can be included in the sample, utilizing oligonucleotide primers, probes and/or primer-probes.

Alternate Methods of Detecting Target Nucleic Acids

Alternatively, detection of the target nucleic acids can occur by measuring the end-point of the reaction. In endpoint detection, the amplicon(s) could be detected by first size-separating the amplicons, and then detecting the size-separated amplicons. The separation of amplicons of different sizes can be accomplished by gel electrophoresis, column chromatography, capillary electrophoresis, or other separation methods known in the art.

The detectable label can be incorporated into, associated with or conjugated to a nucleic acid. Label can be attached by spacer arms of various lengths to reduce potential steric hindrance or impact on other useful or desired properties. See, e.g., Mansfield, 9 *Mol. Cell. Probes* 145-156 (1995). Detectable labels can be incorporated into nucleic acids by covalent or non-covalent means, e.g., by transcription, such as by random-primer labeling using Klenow polymerase, or nick translation, or amplification, or equivalent as is known in the art. For example, a nucleotide base is conjugated to a detectable moiety, such as a fluorescent dye, and then incorporated into nucleic acids during nucleic acid synthesis or amplification.

Examples of other useful labels that aid in the detection of target nucleic acids include radioisotopes (e.g., $^{32}P$, $^{35}S$, $^{3}H$, $^{14}C$, $^{125}I$, $^{131}I$), electron-dense reagents (e.g., gold), enzymes (e.g., horseradish peroxidase, beta-galactosidase, luciferase, alkaline phosphatase), colorimetric labels (e.g., colloidal gold), magnetic labels (e.g., Dynabeads™), biotin, dioxigenin, or haptens and proteins for which antisera or monoclonal antibodies are available. Other labels include ligands or oligonucleotides capable of forming a complex with the corresponding receptor or oligonucleotide complement, respectively. The label can be directly incorporated into the nucleic acid to be detected, or it can be attached to a probe (e.g., an oligonucleotide) or antibody that hybridizes or binds to the nucleic acid to be detected.

In other embodiments, fluorescent nucleotide analogs can be used to label nucleic acids, see, e.g., Jameson, *Methods. Enzymol.* 278: 363-390 (1997); Zhu, *Nucl. Acids Res.* 22: 3418-3422 (1994). U.S. Pat. Nos. 5,652,099 and 6,268,132 also describe nucleoside analogs for incorporation into nucleic acids, e.g., DNA and/or RNA, or oligonucleotides, via either enzymatic or chemical synthesis to produce fluorescent oligonucleotides. U.S. Pat. No. 5,135,717 describes phthalocyanine and tetrabenztriazaporphyrin reagents for use as fluorescent labels.

In some embodiments, detectably labeled probes can be used in hybridization assays including, but not limited to Northern blots, Southern blots, microarray, dot or slot blots, and in situ hybridization assays such as fluorescent in situ hybridization (FISH) to detect a target nucleic acid sequence within a biological sample. Certain embodiments may employ hybridization methods for measuring expression of a polynucleotide gene product, such as mRNA. Methods for conducting polynucleotide hybridization assays have been well developed in the art. Hybridization assay procedures and conditions will vary depending on the application and are selected in accordance with the general binding methods known including those referred to in: Maniatis et al. *Molecular Cloning: A Laboratory Manual* (2nd Ed. Cold Spring Harbor, N.Y., 1989); Berger and Kimmel Methods in Enzymology, Vol. 152, *Guide to Molecular Cloning Techniques* (Academic Press, Inc., San Diego, Calif., 1987); Young and Davis, *PNAS.* 80: 1194 (1983).

*Bordetella* Screening Assay of the Present Technology

The *B. holmesii* genome typically contains about 3-5 copies of the hIS1001 sequence and 8-10 copies of the IS481 sequence. The *B. parapertussis* genome typically contains about 20 copies of the IS1001 sequence. *B. pertussis* typically contains about 50-200 copies of the IS481 sequence.

In various embodiments of the present disclosure, primers and probes are used in the methods described herein to amplify and detect target nucleic acid sequences of pathogenic *Bordetella* species. In certain embodiments, target nucleic acids may include the IS481 insertion sequence (and fragments thereof) from *B. pertussis* and *B. holmesii*, the IS1001 insertion sequence (and fragments thereof) from *B. parapertussis*, and the hIS1001 insertion sequence (and fragments thereof) from *B. holmesii*. In addition, primers can also be used to amplify one or more control nucleic acid sequences.

In some embodiments, the control nucleic acid sequence comprises 5'

(SEQ ID NO: 13)
TAACCCCGCGATAAAGACAGAAGATTATGCATACGAGATCAAAGGAGCCG

GCCTTTTCTCTAGAGATCTCTTATTTTCCTTGAAGTCACCTGTTTATGTT

AAAGCAGGTGAGCAGGTATACATTCAGTACGATCTGAACAAAAGCAATGC

AGAACTTGCTCTCGACTATGGTTTTGTGGAATCAAACCCTAAACGGAACT

CATATACTTTAACAATAGAGATACCAGAATCAGACCCATTCTTTGGGGAT

AAGTTGGATATTGCTGAGAGTAACAAGATGGGTGAGACCGGATACTTTGA

CATAGTAGACGGCCAGACTCTTCCCGCTGGTATGCTTCAGTACCTTCGGC

TTGTGGCTCTTGGCGGTCCAGATGCTTTCTTATTAGAATCTATCTTCAAT

AACACCATATGGGGTCATCTTGAATTGCCTGTAAGTCGTACAAACGAGGA

ACTCATATGCCGTGTTGTCAGAGATGCCTGCAAATCTGCTCTGTCTGGTT

TTGATACGACCATTGAAGAGGATGAGAAGCTTCTGGACAAAGGAAAGCTT

GAGCCTAGGTTGGAAATGGCTCTCAAG 3', and a forward primer comprising 5' GCTTCAGTACCTTCGGCTTG 3' (SEQ ID NO: 17), a reverse primer comprising 5' TTGCAGG-CATCTCTGACAAC 3' (SEQ ID NO: 18) and a detectably labelled nucleic acid probe comprising 5' TGGCTCTTGGCGGTCCAGATG 3' (SEQ ID NO: 19) are used to amplify the control nucleic acid sequence. In some embodiments, the control target nucleic acid comprises 5'

(SEQ ID NO: 20)
GCTTCAGTACCTTCGGCTTGTGGCTCTTGGCGGTCCAGATGCTTTCTTAT

TAGAATCTATCTTCAATAACACCATATGGGGTCATCTTGAATTGCCTGTA

AGTCGTACAAACGAGGAACTCATATGCCGTGTTGTCAGAGATGCCTGCAA

3'.

The primers and probes of the present technology are used in the methods described herein to amplify and detect a target nucleic acid comprising SEQ ID NO: 1 corresponding to the IS481 repeat element, a target nucleic acid comprising SEQ ID NO: 2 corresponding to the IS1001 repeat element, and a target nucleic acid comprising SEQ ID NO: 3 corresponding to the hIS1001 repeat element. In one embodiment, the method involves employing primer pairs specifically directed to IS481, IS1001 and hIS1001 repeat elements. The target nucleic acids described herein may be detected individually or in a multiplex format, utilizing individual labels for each target.

Specific primers, probes and primer-probes for amplification and detection of all or a fragment of a marker gene specific for *B. holmesii* include those directed to sequences present in *B. holmesii*, but absent from other *Bordetella* species. The detection of a *B. holmesii*-specific gene helps to distinguish a sample containing *B. holmesii* from one that may contain another pathogenic species, e.g., *B. pertussis*. A suitable marker gene is the hIS1001 multicopy insertion sequence (see, e.g., GenBank Accession No. AY786982.1) and is shown below.

(SEQ ID NO: 14)
GTGTTGTYAATGCCCTCAACGATGCTGGTGTTGAGCCGGTGGCGACAGCG

AGACAGAATCCCGTGCAGATAGGCTTTTAGCTTGAGCGCGAAGTGAGCCA

AGGCGGCGATGCCGCTGCCCTGAGCCTGTTGCAGCCAGTGATCCCATGCC

TGGCGGGCGTAGCCGGGGTGTTGGTAGAACCACAGCTGTTTGAGCTCATC

GCGCATCAGATAAGCGGTGAGCAAGGGCTGGTTGGCCTGGAGCAACTCGT

CCAACTTTACCGATTGGCACGGATCGAGGTTTTTGCGATTGCGCAGCAGT

AGCCAGCGACTGGACTTGATCACCCGGCGGGCCGGCTTGTCGTGCCGCAA

CTGGTTCGCTTGGTCTACACGCACCCGGTCTATCACTTCACGGCCGTACT

TGGCCACGACGTGGAACAGGTCGTAGACGATCTCGGCGTTGGGGCA

The nucleic acid sequence of the hIS1001 amplicon generated using the methods disclosed herein is underlined.

In some embodiments, the hIS1001 target nucleic acid comprises 5' GGCACGGATCGAGGTTTTTGCGAT-TGCGCAGCAGTAGCCAGCGACTGGACTTGAT CACCCGGCGGGCCGGCTTGTCGTGCCGCAACTGG TTCGCTTGGTCTACACGCACC CGGTCTATCACTT-CACGGCCGTA 3' (SEQ ID NO: 3) or a fragment thereof. Exemplary primer and labeled probe sequences for amplifying and detecting the hIS1001 repeat element include:

| Fwd primer | 5' GGCACGGATCGAGGTTTTT 3' (SEQ ID NO: 4) |
| Rev primer | 5' TACGGCCGTGAAGTGATAGA 3' (SEQ ID NO: 5) |
| Probe | 5' AGTCGCTGGCTACTGCTGCGCA 3' (SEQ ID NO: 6) |

The nucleotide sequence of *B. parapertussis* IS1001 is provided at Genbank Accession No. JX013521.1 and is shown below. The nucleic acid sequence of the IS1001 amplicon generated using the methods disclosed herein is underlined:

(SEQ ID NO: 15)
GCTGGATCGCAAGTTGATGGAGTCGCTGGGAGGCTGGCAGGGCTATGGCG

TCGAACGCGTGGAATGGCCCGAAGACCCAGGGCGCACGCTGTCGATCTAT

TTGAAGCCAACGGCCAAGGTGATGCTGTGCGAGCAGTGCGGCGCGCGGTG

TCGCCAGGTGCATGAGACCACGGTTCGACGGGTGCGAGATCTGCCGTTAT

TCGAGTATCGGGTCGTTCTGCACGTGCCGCGCCGACGCTTGTGGTGTGAG

CAATGCGGCGGCCCGCGCCTGGAGCGGCTTGCCTGGCTGGGGCGATATCA

ACGGGTGACGGATCGGCTGGCGCAGGCCTGCAGCCAATTGCTGCAATCGA

GCAACGTGCAGGCGGTGGCGAGGTTCTTCGAGCTGGGTTGGCATACCGTC

AAGACGCTGGACAAGGCTCGGCTGCGTGCGTCGGTGCGCGAACCGGATTG

GTCCAAGATCGAGTATTTGGCGATGGACGAGTTTGCCCTGCACAAAGGGC

ATCGCTACGCGACAGTGGTGGTCGATCCGATCGGCAGGCAGGTGCTGTGG

ATTGGCCCAGGACGCTCACGCGAGACGGCCCGGGCGTTCTTCGAACAATT

GCCGCCTGGGGCCGCCCAACGCATCAAGGCCGTTGCCATCGACATGACCA

CCGCCTACGAGTTGGAGATCCAGGCCCACAGCCCACAGGCGGAGATCGTC

TATGACTTGTTCCATGTCGTGGCCAAGTATGGACGAGAGGTCATTGATCG

GGTGCGCGTGGATCAGGCCAATCAACTACGCCAGGATCGTCCCGCACGCA

GGATCATCAAATCGAGTCGCTGGCTGCTGCTGCGCAACCGTGACAACCTG

GATCGGCAGCAGGCCGTCCGGCTCGACGAATTGCTGCAAGCCAACCAGCC

GCTGCTGACGGTCTATGTCCTGCGTGACGAACTCAAACGGCTCTGGTTCT

ACCAAAGACCTGCCTGGGCAAGACAAGCCTGGAACCACTGGTACGAGCAG

GCCGAGCAAAGCGGAATAGCCGCCTTGAACACCTTCGCTCAGCGCTTGAA

AGGCTATCTGCACGGCATCCTGGCCAGATGCCGACATCCCCTGAACACCA

GCATTGTCGAGGGCATCAACAACACTATCAAGGTCATCAAGCGGCGCGCT

TACGGCTACCGCGACCAGGAATACTTCTTCCTCAAAATCC

In some embodiments, the IS1001 target nucleic acid comprises 5' CGGCTCGACGAATTGCTGCAAGC-CAACCAGCCGCTGCTGACGGTCTATGTCCTGC GTGACGAACT 3' (SEQ ID NO: 2) or a fragment thereof. Exemplary primer and labeled probe sequences for amplifying and detecting the IS1001 multicopy insertion sequence (see, e.g., GenBank Accession No. JX013521.1) include:

| Fwd primer | 5' CGGCTCGACGAATTGC 3' (SEQ ID NO: 7) |
| Rev primer | 5' AGTTCGTCACGCAGGACAT 3' (SEQ ID NO: 8) |
| Probe | 5' CAACCAGCCGCTGCTGACGGTC 3' (SEQ ID NO: 9) |

The nucleotide sequence of *B. pertussis* IS481 is provided at Genbank Accession No. AB473880.1 and is shown below. The nucleic acid sequence of the IS481 amplicon generated using the methods disclosed herein is underlined:

(SEQ ID NO: 16)
GTTAGGTGTGAAGATTCAATAGGTTGTATGCATGGTTCATCCGAACCGGA

TTTGAGAAACTGGAAATCGCCACCCCCCCAGTTCACTCAAGGAGCCCGGC

CGGATGAACACCCATAAGCATGCCCGATTGACCTTCCTACGTCGACTCGA

AATGGTCCAGCAATTGATCGCCCATCAAGTTTGTGTGCCTGAAGCGGCCC

GCGCCTATGGGGTCACCGCGCCGACTGTGCGCAAATGGCTGGGCCGCTTC

CTGGCTCAGGGCCAGGCGGGCTTGGCCGATGCGTCCTCGCGCCCGACGGT

-continued
```
CTCGCCCCGAGCGATTGCGCCGGCCAAGGCGCTGGCTATCGTGGAGCTGC

GCCGCAAGCGGCTGACCCAAGCGCGCATCGCCCAGGCGCTGGGCGTGTCA

GCCAGCACCGTCAGCCGCGTCCTGGCCCGCGCCGGTCTGTCGCACCTGGC

CGACCTGGAGCCGGCCGAGCCGGTGGTGCGCTACGAGCATCAGGCCCCCG

GCGATCTGCTGCACATCGACATCAAGAAGCTGGGACGTATCCAGCGCCCT

GGCCACCGGGTCACGGGCCACCGACGCGATACCGTTGAGGGGCCGGCTG

GGACTTCGTCTTCGTGGCCATCGATGACCACGCCCGCGTGGCCTTCACCG

ACATCCACCCCGACGAGCGCTTCCCCAGCGCCGTCCAGTTCCTCAAGGAC

GCAGTGGCCTACTACCAGCGCCTGGGCGTGACCATCCAGCGCTTGCTCAC

CGACAATGGCTCGGCCTTTCGCAGCCGCGCCTTCGCCGCGCTGTGCCATG

AGCTGGGCATCAAGCACCGCTTTACCCGACCTTACCGCCCACAGACCAAT

GGCAAGGCCGAACGCTTCATCCAGTCGGCCTTGCGTGAGTGGGCTTACGC

TCACACCTACCAGAACTCCCAACACCGAGCCGATGCCATGAAATCCTGGT

TACACCACTACAACTGGCATCGACCCCACCAAGGCATCGGGCGCGCTGTA

CCCATCTCCAGACTCAACCTGGACGAATACAACCTATTGACAGTTCACAG

TTAGG
```

In some embodiments, the IS481 target nucleic acid comprises 5' CCATAAGCATGCCCGATTGACCTTCC-TACGTCGACTCGAAATGGTCCAGCAATTG ATCGCC-CATCAAGTTTGTGTGCCTGAAGCG 3' (SEQ ID NO: 1) or a fragment thereof. Exemplary primer and labeled probe sequences for amplifying and detecting the IS481 multicopy insertion sequence (see, e.g., GenBank Accession No. AB473880.1 include:

```
Rev primer     5' CGCTTCAGGCACACAAACT 3'
               (SEQ ID NO: 10)

Fwd primer     5' CCATAAGCATGCCCGATT 3'
               (SEQ ID NO: 11)

Probe          5' TCAATTGCTGGACCATTTCGAGTCGAC 3'
               (SEQ ID NO: 12)
```

Accordingly, qualitative detection and differentiation of B. holmesii and B. pertussis using the disclosed method may utilize primer pairs, labeled probes and real-time PCR for amplification and detection of the IS481, IS1001 and hIS1001 repeat elements on a direct amplification disc with an integrated cycler system. With this method, target genomic DNA is specifically amplified and simultaneously detected by fluorescent-labeled probes in the same reaction. The probe that specifically hybridizes to the hIS1001 repeat element may comprise a JOE label and each of the probes that specifically hybridizes to the IS481 and IS1001 repeat elements may comprise a FAM label and a CFR610 label respectively. The probe that specifically hybridizes to the control target nucleic acid may comprise a Q670 fluorophore.

Accordingly, in one aspect, the present disclosure provides a method for detecting the presence of at least one pathogenic Bordetella species in a biological sample comprising: (a) contacting the biological sample with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof, and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) detecting the presence of at least one pathogenic Bordetella species in the biological sample by evaluating the fluorescent signal of each target nucleic acid, whereby (i) B. holmesii is detected in the biological sample when a fluorescent signal is detected for the hIS1001 target nucleic acid; (ii) B. parapertussis is detected in the biological sample when a fluorescent signal is detected for the IS1001 target nucleic acid; and (iii) B. pertussis is detected in the biological sample when a fluorescent signal is detected for the IS481 target nucleic acid and no fluorescent signal is detected for the hIS1001 target nucleic acid, wherein the pathogenic Bordetella species is one or more of B. pertussis, B. parapertussis, and B. holmesii; and wherein the biological sample is not subjected to an extraction or purification step prior to amplification. Real-time PCR amplification may be performed in a direct amplification disc in concert with an integrated thermal cycler. The biological sample may comprise a nasopharyngeal (NP) aspirate or wash, nasal swab, or a bacterial isolate.

Treatment for Bordetella Infection

Disclosed herein are methods for determining whether a patient exhibiting pertussis-like symptoms will benefit from treatment with therapeutic agents that inhibit B. holmesii, either alone or in combination with therapeutic agents that target other pathogenic Bordetella species.

Examples of therapeutic agents that inhibit B. holmesii include fluoroquinolones, carbapenems, trimethoprim-sulfamethoxazole (e.g., Bactrim, Septra), and B. holmesii-specific antibodies. In some embodiments, the fluoroquinolones are selected from the group consisting of ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin. In certain embodiments, the carbapenems are selected from the group consisting of imipenem, meropenem, ertapenem, doripenem, panipenem, biapenem, razupenem (PZ-601), tebipenem, lenapenem, tomopenem, and thienpenem (Thienamycin).

Examples of therapeutic agents that inhibit B. pertussis include whole-cell (wP) B. pertussis vaccine, acellular B. pertussis vaccine, trimethoprim-sulfamethoxazole (e.g., Bactrim, Septra), telithromycin and macrolide-antibiotics. In some embodiments, the macrolide-antibiotics are selected from the group consisting of azithromycin (Zithromax), clarithromycin (Biaxin), erythromycin (E-Mycin, Eryc, Ery-Tab, PCE, Pediazole, Ilosone), and roxithromycin.

Examples of therapeutic agents that inhibit B. parapertussis include trimethoprim-sulfamethoxazole (e.g., Bactrim, Septra), ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin.

In one aspect, the present disclosure provides a method for selecting a patient exhibiting pertussis-like symptoms for treatment with a therapeutic agent that inhibits *B. holmesii* comprising: (a) contacting a biological sample obtained from the patient with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof; and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a therapeutic agent that inhibits *B. holmesii*, if a fluorescent signal for the hIS1001 target nucleic acid is detected, wherein the biological sample is not subjected to an extraction or purification step prior to amplification.

In some embodiments, the therapeutic agent that inhibits *B. holmesii* is one or more agents selected from the group consisting of fluoroquinolones, carbapenems, trimethoprim-sulfamethoxazole and *B. holmesii*-specific antibodies. In certain embodiments, the fluoroquinolones are selected from the group consisting of ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin. In some embodiments, the carbapenems are selected from the group consisting of imipenem, meropenem, ertapenem, doripenem, panipenem, biapenem, razupenem (PZ-601), tebipenem, lenapenem, tomopenem, and thienpenem (Thienamycin).

In one aspect, the present disclosure provides a method for selecting a patient exhibiting pertussis-like symptoms for treatment with a *B. holmesii*-specific antibody and an additional therapeutic agent that inhibits *B. parapertussis* comprising: (a) contacting a biological sample obtained from the patient with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof; and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a *B. holmesii*-specific antibody and an additional therapeutic agent if a fluorescent signal for the hIS1001 target nucleic acid and a fluorescent signal for the IS1001 target nucleic acid are detected, wherein the biological sample is not subjected to an extraction or purification step prior to amplification.

In some embodiments, the additional therapeutic agent that inhibits *B. parapertussis* is one or more agents selected from the group consisting of trimethoprim-sulfamethoxazole, ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin.

In another aspect, the present disclosure provides a method for selecting a patient exhibiting pertussis-like symptoms for treatment with a therapeutic agent that inhibits *B. pertussis* and an additional therapeutic agent that inhibits *B. parapertussis* comprising: (a) contacting a biological sample obtained from the patient with: (i) a first primer pair that amplifies an IS481 target nucleic acid comprising nucleotides that are at least 85-95% identical to SEQ ID NO: 1 or a complement thereof; (ii) a second primer pair that amplifies an IS1001 target nucleic acid comprising nucleotides that are at least 85-95% identical to SEQ ID NO: 2 or a complement thereof; and (iii) a third primer pair that amplifies a hIS1001 target nucleic acid comprising nucleotides that are at least 85-95% identical to SEQ ID NO: 3 or a complement thereof, to produce a reaction-sample mixture under conditions where amplification of the IS481, IS1001, and hIS1001 target nucleic acids, if present in the biological sample, occurs without extracting the target nucleic acids from the biological sample; (b) subjecting the reaction-sample mixture to real-time PCR conditions under which each of the target nucleic acids present in the biological sample is amplified to produce a fluorescent signal; (c) detecting the fluorescent signal generated by each amplified target nucleic acid produced in step (b); and (d) selecting the patient for treatment with a therapeutic agent that inhibits *B. pertussis* and an additional therapeutic agent that inhibits *B. parapertussis*, if (i) a fluorescent signal for the IS481 target nucleic acid and a fluorescent signal for the IS1001 target nucleic acid are detected, and (ii) no fluorescent signal for the hIS1001 target nucleic acid is detected, wherein the biological sample is not subjected to an extraction or purification step prior to amplification.

In some embodiments of the method, the additional therapeutic agent that inhibits *B. parapertussis* is one or more agents selected from the group consisting of trimethoprim-sulfamethoxazole, ciprofloxacin, gemifloxacin, levofloxacin, norfloxacin, ofloxacin, rovafloxacin, gatifloxacin, grepafloxacin, temafloxacin, lomefloxacin, sparfloxacin, enoxacin, and moxifloxacin.

In some embodiments of the method, wherein the therapeutic agent that inhibits *B. pertussis* is one or more agents selected from the group consisting of whole-cell (wP) *B. pertussis* vaccine, acellular *B. pertussis* vaccine, telithromycin and macrolide-antibiotics. In certain embodiments, the macrolide-antibiotics are selected from the group consisting of azithromycin (Zithromax), clarithromycin (Biaxin), erythromycin (E-Mycin, Eryc, Ery-Tab, PCE, Pediazole, Ilosone), and roxithromycin.

Algorithms

Upon subjecting the sample-reaction mixtures to real-time PCR, and detecting and measuring the fluorescence signals associated with the amplified IS481, IS1001, and hIS1001 target repeat elements, the methods of the present technology further provide an algorithm for determining the presence of one or more related pathogenic *Bordetella* species (i.e., *B. pertussis*, *B. parapertussis*, and *B. holmesii*), which provides the final results by matching cycle threshold (Ct) from the amplified target nucleic acid sequences.

In some embodiments, the hIS1001 target nucleic acid sequence is amplified using a probe that is labeled with JOE, the IS1001 target nucleic acid sequence is amplified using a probe labeled with a xanthene dye that fluoresces in the red region of the visible spectrum such as CFR610, and the IS481 target nucleic acid sequence is amplified using a probe that is labeled with a fluorescein amidite fluorophore such as FAM. Thus, the signal for hIS1001 is detected via the JOE fluorophore, the signal for IS1001 is detected via the CFR610 fluorophore and the signal for IS481 is detected via the FAM fluorophore.

The *Bordetella* species algorithm dictates:

| Interpretation | IS481 | hIS1001 | IS1001 | Internal control | Compare Rule (Ct) |
|---|---|---|---|---|---|
| *B. holmesii* and *B. parapertussis* | N/A | Detected | Detected | N/A | |
| *B. pertussis* and *B. parapertussis* | Detected | Not Detected | Detected | N/A | |
| *B. pertussis* | Detected | Not Detected | Not Detected | N/A | |
| *B. holmesii* | N/A | Detected | Not Detected | N/A | |
| *B. parapertussis* | Not Detected | Not Detected | Detected | N/A | |
| Negative | Not Detected | Not Detected | Not Detected | Detected | |
| Invalid | Not Detected | Not Detected | Not Detected | Not Detected | |

N/A = Detected signal not applicable to analysis

Accordingly, the presence or absence of pathogenic *Bordetella* species in a sample can be determined based on the following scenarios:

(1) A sample with a detectable signal (FAM) for the IS481 target nucleic acid sequence but no detectable CFR610 signal for IS1001 and no detectable JOE signal for hIS1001 is interpreted as containing *B. pertussis* only.

(2) A sample with a detectable signal (CFR610) for the IS1001 target nucleic acid sequence but no detectable FAM signal for IS481 and no detectable JOE signal for hIS1001 is interpreted as containing *B. parapertussis* only.

(3) A sample with a detectable signal (JOE) for the hIS1001 target nucleic acid sequence but no detectable CFR610 signal for IS1001 is interpreted as containing *B. holmesii* only.

(4) When a fluorescent signal is detected for both the IS481 target nucleic acid sequence (FAM) and the IS1001 target nucleic acid sequence (CFR610) but not hIS1001 (JOE), the sample is identified as containing both *B. pertussis* and *B. parapertussis*.

(5) When a fluorescent signal is detected for both the IS1001 target nucleic acid sequence (CFR610) and the hIS1001 target nucleic acid sequence (JOE), the sample is identified as containing both *B. holmesii* and *B. parapertussis*.

(6) A sample lacking a detectable signal for IS481 (FAM), IS1001 (CFR610) and hIS1001 (JOE) is interpreted as negative for *B. pertussis, B. parapertussis* and *B. holmesii*.

Kits

The present disclosure also provides kits for detecting target nucleic acid sequences corresponding to pathogenic *Bordetella* species.

Kits of the present technology comprise at least two oligonucleotides which may serve as primers or primer-probes for amplifying one or more multicopy insertion sequences selected from the group consisting of IS481, IS1001 and hIS1001 to determine the presence of pathogenic *Bordetella* species in a biological sample.

In some embodiments, the kits of the present technology comprise a single primer pair that specifically hybridizes to a target nucleic acid of a single multicopy insertion sequence selected from the group consisting of IS481, IS1001 and hIS1001. In other embodiments, the kits of the present technology comprise multiple primer pairs comprising a first primer pair that specifically hybridizes to a target nucleic acid for IS481, and a second primer pair that specifically hybridizes to a target nucleic acid for IS1001 or hIS1001. In certain embodiments, the kits of the present technology comprise multiple primer pairs comprising a first primer pair that specifically hybridizes to a target nucleic acid for IS1001, and a second primer pair that specifically hybridizes to a target nucleic acid for hIS1001. In certain embodiments, the kits of the present technology comprise multiple primer pairs comprising a first primer pair that specifically hybridizes to a target nucleic acid for IS481, a second primer pair that specifically hybridizes to a target nucleic acid for IS1001, and a third primer pair that specifically hybridizes to a target nucleic acid for hIS1001. In any of the above embodiments, the target nucleic acid for IS481 corresponds to SEQ ID NO: 1; the target nucleic acid for IS1001 corresponds to SEQ ID NO: 2; and the target nucleic acid for hIS1001 corresponds to SEQ ID NO: 3.

In some embodiments, the kits comprise a first primer pair that is capable of specifically hybridizing to an IS481 target nucleic acid comprising nucleotides that are at least 85-95% identical to SEQ ID NO: 1, or a complement thereof. Additionally or alternatively, the kits comprise a second primer pair that is capable of specifically hybridizing to an IS1001 target nucleic acid comprising nucleotides that are at least 85-95% identical to SEQ ID NO: 2, or a complement thereof. Additionally or alternatively, the kits comprise a third primer pair that is capable of specifically hybridizing to a hIS1001 target nucleic acid comprising nucleotides that are at least 85-95% identical to SEQ ID NO: 3, or a complement thereof.

In some embodiments, the kits comprise one or more primer pairs selected from among 5' CCATAAGCATGCCC-GATT 3' (SEQ ID NO: 11) and 5' CGCTTCAGGCACACAAACT 3'(SEQ ID NO: 10) (IS481 primer pair); 5' CGGCTCGACGAATTGC 3' (SEQ ID NO: 7) and 5' AGTTCGTCACGCAGGACAT 3' (SEQ ID NO: 8) (IS1001 primer pair); and 5' GGCACGGATCGAGGTTTTT 3' (SEQ ID NO: 4) and 5' TACGGCCGTGAAGTGATAGA 3' (SEQ ID NO: 5) (hIS1001). Additionally or alternatively, the kits comprise an internal control primer pair consisting of a forward primer comprising 5' GCTTCAGTACCTTCGGCTTG 3' (SEQ ID NO: 17), and a reverse primer comprising 5' TTGCAGG-CATCTCTGACAAC 3' (SEQ ID NO: 18).

Additionally or alternatively, in some embodiments, the kits provide a single nucleic acid probe that specifically hybridizes to a target nucleic acid of a single multicopy insertion sequence selected from the group consisting of IS481, IS1001 and hIS1001. In other embodiments, the kits of the present technology comprise multiple nucleic acid probes comprising a first nucleic acid probe that specifically hybridizes to a target nucleic acid for IS481, and a second nucleic acid probe that specifically hybridizes to a target nucleic acid for IS1001 or hIS1001. In certain embodiments, the kits of the present technology comprise multiple nucleic acid probes comprising a first nucleic acid probe that specifically hybridizes to a target nucleic acid for IS1001, and a second nucleic acid probe that specifically hybridizes to a target nucleic acid for hIS1001. In certain embodiments, the kits of the present technology comprise multiple nucleic acid probes comprising a first nucleic acid probe that specifically hybridizes to a target nucleic acid for IS481, a second nucleic acid probe that specifically hybridizes to a target nucleic acid for IS1001, and a third nucleic acid probe that specifically hybridizes to a target nucleic acid for hIS1001.

In some embodiments, the first nucleic acid probe is capable of specifically hybridizing to a segment of the IS481 target nucleic acid of SEQ ID NO: 1 or a complement thereof, and is detectably labeled with a fluorophore. Additionally or alternatively, in some embodiments, the second nucleic acid probe is capable of specifically hybridizing to a segment of the IS1001 target nucleic acid of SEQ ID NO: 2 or a complement thereof, and is detectably labeled with a fluorophore. In some embodiments, the third nucleic acid probe is capable of specifically hybridizing to a segment of the hIS1001 target nucleic acid of SEQ ID NO: 3 or a complement thereof, and is detectably labeled with a fluorophore.

In some embodiments, the kits comprise one or more nucleic acid probes selected from among 5' TCAATTGCTGGACCATTTCGAGTCGAC 3' (SEQ ID NO: 12) or a complement thereof (IS481 probe); 5' CAACCAGCCGCTGCTGACGGTC 3' (SEQ ID NO: 9) or a complement thereof (IS1001 probe); and 5' AGTCGCTGGCTACTGCTGCGCA 3' (SEQ ID NO: 6) or a complement thereof (hIS1001 probe). Additionally or alternatively, the kits comprise an internal control nucleic acid probe comprising 5' TGGCTCTTGGCGGTCCAGATG 3' (SEQ ID NO: 19) or a complement thereof.

In some embodiments, the kit comprises liquid medium containing the at least one target-specific nucleic acid probe in a concentration of 250 nM or less. With such a kit, the probes are provided in the required amount to perform reliable multiplex detection reactions according to the present technology. In some embodiments, the target-specific nucleic acid probes are detectably labeled.

In some embodiments, the kits further comprise buffers, enzymes having polymerase activity, enzymes having polymerase activity and lacking 5'→3' exonuclease activity or both 5'→3' and 3'→5' exonuclease activity, enzyme cofactors such as magnesium or manganese, salts, chain extension nucleotides such as deoxynucleoside triphosphates (dNTPs), modified dNTPs, nuclease-resistant dNTPs or labeled dNTPs, necessary to carry out an assay or reaction, such as amplification and/or detection of target nucleic acid sequences corresponding to pathogenic *Bordetella* species.

In one embodiment, the kits of the present technology further comprise a positive control nucleic acid sequence and a negative control nucleic acid sequence to ensure the integrity of the assay during experimental runs. A kit may further contain a means for comparing the copy number of one or more of IS481, IS1001 and hIS1001 in a biological sample with a reference nucleic acid sample (e.g., a sample having a known copy number for one or more of IS481, IS1001 and hIS1001). The kit may also comprise instructions for use, software for automated analysis, containers, packages such as packaging intended for commercial sale and the like.

The kit may further comprise one or more of: wash buffers and/or reagents, hybridization buffers and/or reagents, labeling buffers and/or reagents, and detection means. The buffers and/or reagents are usually optimized for the particular amplification/detection technique for which the kit is intended. Protocols for using these buffers and reagents for performing different steps of the procedure may also be included in the kit.

The kit additionally may comprise an assay definition scan card and/or instructions such as printed or electronic instructions for using the oligonucleotides in an assay. In some embodiments, a kit comprises an amplification reaction mixture or an amplification master mix. Reagents included in the kit may be contained in one or more containers, such as a vial.

Primers, probes, and/or primer-probes specific for amplification and detection of DNA internal control may be included in the amplification master mix as the target primer pairs to monitor potential PCR inhibition. Reagents necessary for amplification and detection of targets and internal control may be formulated as an all-in-one amplification master mix, which may be provided as single reaction aliquots in a kit.

EXAMPLES

Example 1: Detection of Pathogenic *Bordetella* Species Using SIMPLEXA Direct Real-Time PCR Nasopharyngeal swab samples are collected from patients. 50 µL of the unprocessed and undiluted nasal swab sample is loaded directly into a sample well of wedge 1 of a SIMPLEXA Direct Amplification Disc (Focus Diagnostics, Inc., Cypress, Calif., USA) without performing a separate front-end specimen preparation step.

50 µL of Amplification master mix is pipetted into the reaction well of wedge 1 of the disc, wherein the amplification master mix contains PCR buffer, DNA polymerase, dNTPs, magnesium chloride, potassium chloride, primers consisting of SEQ ID NOs: 4-5, 7-8 and 10-11, probes consisting of SEQ ID NOs: 6, 9 and 12, and an internal control DNA fragment (SEQ ID NO: 13) and a primer pair and probe specific to the control fragment (SEQ ID NOs: 17-19). The TaqMan probes consisting of SEQ ID NOs: 6, 12, 9, and 19 are labeled with JOE, FAM, CFR610 and Q670 respectively. A positive control spiked with cultured *Bordetella pertussis*, *Bordetella parapertussis*, and *Bordetella holmesii*, and a negative control are included in the assay.

The wedge is sealed with foil and the Direct Amplification Disc is then inserted into a 3M™ Integrated Cycler (3M, St. Paul, Minn., USA) and Real-time PCR commences in the cycler. The PCR cycling conditions include the following steps: i) sample pre-heat at 75° C., 300 seconds, 1 cycle ii) polymerase activation at 97° C., 120 seconds, 1 cycle, and iii) Denaturation at 97° C., 10 seconds and annealing at 56° C., 30 seconds for 40 cycles. The specific fluorescent threshold concentrations of amplicons corresponding to IS481, IS1001 and hIS1001 are set at 2000, 5000 and 2000 respectively.

Target genomic DNA is specifically amplified and simultaneously detected by fluorescent-labeled probes in the same reaction. The presence of pathogenic *Bordetella* species is determined by the following algorithm, which provides the final results by evaluating cycle threshold (Ct) in the FAM, JOE and CFR610 channels.

(1) A sample with a detectable FAM signal but no detectable CFR610 and JOE signals is interpreted as positive for *B. pertussis*.

(2) A sample with a detectable CFR610 signal but no detectable FAM and JOE signals is interpreted as positive for *B. parapertussis*.

(3) A sample with a detectable JOE signal but no detectable CFR610 signal is interpreted as positive for *B. holmesii*.

(4) A sample with signal in the FAM and CFR610 channels but no detectable JOE signal is interpreted as positive for both *B. pertussis* and *B. parapertussis*.

(5) A sample with signal in the JOE and CFR610 channels is interpreted as positive for both *B. holmesii* and *B. parapertussis*.

Example 2: Limit of Detection of the *Bordetella* Multiplex Assay

A Limit of Detection (LoD) study will be performed to determine the analytical sensitivity of the Simplexa™ *Bordetella* Direct assay in nasopharyngeal swab matrices using quantified bacterial strains of *B. pertussis, B. parapertussis* and *B. holmesii*. Each bacterial strain will be screened for presumptive LoD and subsequently confirmed. The LoD for each strain will be determined as the lowest concentration with ≥85-95% detection for 20 replicates (≥19 out of 20 replicates detected).

Example 3: Cross-Reactivity of the *Bordetella* Multiplex Assay

For cross-reactivity assays, control nasal swab specimens will be spiked with one of the test organisms listed below (n=5 for each organism).

| | |
|---|---|
| *Bacillus cereus* | *Chlamydophila pneumoniae* |
| *Haemophilus influenzae* | *Klebsiella pneumonia* |
| *Legionella pneumophila* | *Mycoplasma pneumonia* |
| *Streptococcus pneumoniae* | *Staphylococcus aureus* |
| *Moraxella catarrhalis* | Influenza A |
| Influenza B | RSV B |

The *Bordetella* multiplex assay will be performed on each sample. In each case, a Ct value ≤40 is interpreted as a positive result for *B. pertussis* cross-reactivity, a Ct value of ≤40 is interpreted as a positive result for *B. parapertussis* cross-reactivity, and a Ct value of ≤40 is interpreted as a positive result for *B. holmesii* cross-reactivity.

It is anticipated that no cross-reactivity will be observed for any of the above microbial species.

Example 4: Comparison of *Bordetella* SIMPLEXA Direct Real-Time PCR Results to Bi-Directional Sequencing Clinical performance of the Simplexa™ *Bordetella* Direct assay was assessed using a panel of 284 nasopharyngeal swab specimens. The panel contained 102 positives for *Bordetella pertussis*, 37 positives for *Bordetella parapertussis*, 37 positives for *Bordetella holmesii*, and 108 negatives for all targets. Thirty-five *B. holmesii* positive samples were contrived. The Simplexa™ assay results were compared to bi-directional sequencing results to determine positive and negative agreement. The optimized thresholds for FAM, JOE, CFR610 and Q670 were 2000, 2000, 5000 and 5000 respectively.

TABLE 1

*Bordetella pertussis* Concordance

| Simplexa | Sequencing | | | |
|---|---|---|---|---|
| | BP Positive | BP Negative | Total | % Agreement |
| BP Positive | 99 | 8[a] | 107 | % Positive Agreement 97.1% (99/102) |
| BP Negative | 3[b] | 174 | 177 | % Negative Agreement 95.6% (174/182) |
| Total | 102 | 182 | 284 | |

[a]8 samples were reported as *Bordetella pertussis* negative by sequencing but reported as *Bordetella pertussis* positive by Simplexa with 39.2, 37.1, 36.1, 36.0, 37.3, 36.9, 38.0, and 37.1 Ct values respectively.
[b]3 samples were reported as *Bordetella pertussis* positive by sequencing but reported as *Bordetella pertussis* negative by Simplexa.

TABLE 2

*Bordetella parapertussis* Concordance

| Simplexa | Sequencing | | | |
|---|---|---|---|---|
| | BPP Positive | BPP Negative | Total | % Agreement |
| BPP Positive | 37 | 3[c] | 40 | % Positive Agreement 100.0% (37/37) |
| BPP Negative | 0 | 244 | 244 | % Negative Agreement 98.8% (244/247) |
| Total | 37 | 247 | 284 | |

[c]3 samples were reported as *Bordetella parapertussis* negative by sequencing but reported as *Bordetella parapertussis* positive by Simplexa with 38.2, 36.5 and 39.8 Ct values respectively.

TABLE 3

*Bordetella holmesii* Concordance

| Simplexa | Sequencing | | | |
|---|---|---|---|---|
| | BH Positive | BH Negative | Total | % Agreement |
| BH Positive | 37 | 1[d] | 38 | % Positive Agreement 100.0% (37/37) |
| BH Negative | 0 | 246 | 246 | % Negative Agreement 99.6% (246/247) |
| Total | 37 | 247 | 284 | |

[d]1 sample was reported as *Bordetella holmesii* negative by sequencing but reported as *Bordetella holmesii* positive by Simplexa with 33.4 Ct value.

Results.

Using the 284 de-identified clinical specimens, the percent positive and negative agreements with bi-directional sequencing results for *Bordetella pertussis* were 97.1% (99/102) and 95.6% (174/182) for clinical nasopharyngeal specimens (Table 1), respectively. The percent positive and negative agreements with bi-directional sequencing results for *Bordetella parapertussis* were 100% (37/37) and 98.8% (244/247) for clinical nasopharyngeal specimens (Table 2), respectively. The percent positive and negative agreements with bi-directional sequencing results for *Bordetella holmesii* were 100% (37/37) and 99.6% (246/247) for clinical nasopharyngeal specimens (Table 3), respectively.

These results demonstrate that the Simplexa™ *Bordetella* Direct assay was capable of directly detecting *Bordetella pertussis*, *Bordetella parapertussis*, and *Bordetella holmesii* in nasopharyngeal specimens without requiring a separate nucleic acid extraction step, and had a performance that was comparable to that observed with bi-directional sequencing.

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

The terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the disclosure claimed.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

All patents, patent applications, provisional applications, and publications referred to or cited herein are incorporated by reference in their entirety, including all figures and tables, to the extent they are not inconsistent with the explicit teachings of this specification.

The invention claimed is:

1. A method for detecting the presence of at least one pathogenic *Bordetella* species in an unprocessed biological sample comprising:
   (a) contacting the biological sample with:
      i. a first primer pair that amplifies an IS481 target nucleic acid consisting of SEQ ID NO: 1 or a complement thereof wherein the first primer consists of a first forward primer consisting of 5' CCATAAGCATGCCCGATT 3' (SEQ ID NO: 11) and a first reverse primer consisting of 5' CGCTTCAGGCACACAAACT 3' (SEQ ID NO: 10);
      ii. a second primer pair that amplifies an IS1001 target nucleic acid consisting of SEQ ID NO: 2 or a complement thereof wherein the second primer consists of a second forward primer consisting of 5' CGGCTCGACGAATTGC 3' (SEQ ID NO: 7) and a second reverse primer consisting of 5' AGTTCGTCACGCAGGACAT 3' (SEQ ID NO: 8); and
      iii a third primer pair that amplifies a hIS1001 target nucleic acid consisting of SEQ ID NO: 3 or a complement thereof, wherein the third primer pair consists of a third forward primer consisting of 5' GGCACGGATCGAGGTTTTT 3' (SEQ ID NO: 4) and a third reverse primer consisting of 5' TACGGCCGTGAAGTGATAGA 3' (SEQ ID NO: 5);
   to produce a reaction-sample mixture under conditions where amplification of the IS481, IS1001, and hIS1001 target nucleic acids occurs if present in the biological sample, wherein the biological sample is not processed prior to amplification, and wherein the biological sample is a nasopharyngeal (NP) aspirate or wash, or a nasopharyngeal swab;
   (b) subjecting the reaction-sample mixture to real-time multiplex PCR conditions under which each of the target nucleic acids present in the biological sample is amplified to produce a fluorescent signal;
   (c) detecting the fluorescent signal generated by each amplified target nucleic acid produced in step (b); and
   (d) detecting the presence of at least one pathogenic *Bordetella* species in the biological sample by evaluating the fluorescent signal of each target nucleic acid, whereby
      i. *B. holmesii* is detected in the biological sample when a fluorescent signal is detected for the hIS1001 target nucleic acid;
      ii. *B. parapertussis* is detected in the biological sample when a fluorescent signal is detected for the IS1001 target nucleic acid; and
      iii. *B. pertussis* is detected in the biological sample when a fluorescent signal is detected for the IS481 target nucleic acid and no fluorescent signal is detected for the hIS1001 target nucleic acid;
   wherein the pathogenic *Bordetella* species is one or more of *B. pertussis, B. parapertussis*, and *B. holmesii*.

2. The method of claim 1, further comprising contacting the biological sample with
   (i) a first nucleic acid probe that is capable of specifically hybridizing to a segment of the IS481 target nucleic acid of SEQ ID NO: 1, wherein the first nucleic acid probe is detectably labeled and comprises 5' TCAATTGCTGGACCATTTCGAGTCGAC 3' (SEQ ID NO: 12), optionally wherein the first nucleic acid probe is detectably labelled with a FAM fluorophore,
   (ii) a second nucleic acid probe that is capable of specifically hybridizing to a segment of the complement of the IS1001 target nucleic acid of SEQ ID NO: 2, wherein the second nucleic acid probe is detectably labeled and comprises 5' CAACCAGCCGCTGCTGACGGTC 3' (SEQ ID NO: 9), optionally wherein the second nucleic acid probe is detectably labelled with a CFR610 fluorophore; and
   (iii) a third nucleic acid probe that is capable of specifically hybridizing to a segment of the hIS1001 target nucleic acid of SEQ ID NO: 3, wherein the third nucleic acid probe is detectably labeled and comprises 5' AGTCGCTGGCTACTGCTGCGCA 3' (SEQ ID NO: 6), optionally wherein the third nucleic acid probe is detectably labelled with a JOE fluorophore.

3. The method of claim 1, further comprising contacting the biological sample with a fourth primer pair that amplifies a control target nucleic acid of SEQ ID NO: 20, optionally wherein the fourth primer pair consists of a fourth forward primer comprising 5' GCTTCAGTACCTTCGGCTTG 3' (SEQ ID NO: 17) and a fourth reverse primer comprising 5' TTGCAGGCATCTCTGACAAC 3' (SEQ ID NO: 18); and/or
   further comprising contacting the biological sample with a fourth nucleic acid probe, wherein the fourth nucleic acid probe is detectably labeled and comprises 5' TGGCTCTTGGCGGTCCAGATG 3' (SEQ ID NO: 19), optionally wherein the fourth nucleic acid probe is detectably labelled with the Q670 fluorophore.

4. The method of claim 1, wherein real-time PCR amplification is performed in a direct amplification disc in concert with an integrated thermal cycler.

5. The method of claim 1, wherein the biological sample is a nasopharyngeal swab.

* * * * *

SEQUENCE LISTING

```
<160> NUMBER OF SEQ ID NOS: 20

<210> SEQ ID NO 1
<211> LENGTH: 85
<212> TYPE: DNA
<213> ORGANISM: Bordetella pertussis

<400> SEQUENCE: 1
ccataagcat gcccgattga ccttcctacg tcgactcgaa atggtccagc aattgatcgc     60
ccatcaagtt tgtgtgcctg aagcg                                          85

<210> SEQ ID NO 2
<211> LENGTH: 65
<212> TYPE: DNA
<213> ORGANISM: Bordetella parapertussis

<400> SEQUENCE: 2
cggctcgacg aattgctgca agccaaccag ccgctgctga cggtctatgt cctgcgtgac     60
gaact                                                                65

<210> SEQ ID NO 3
<211> LENGTH: 133
<212> TYPE: DNA
<213> ORGANISM: Bordetella holmesii

<400> SEQUENCE: 3
ggcacggatc gaggttttttg cgattgcgca gcagtagcca gcgactggac ttgatcaccc    60
ggcgggccgg cttgtcgtgc cgcaactggt tcgcttggtc tacacgcacc cggtctatca   120
cttcacggcc gta                                                      133
```

<210> SEQ ID NO 4
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
ggcacggatc gaggttttt                                                 19

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
tacggccgtg aagtgataga                                                20

<210> SEQ ID NO 6
<211> LENGTH: 22
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 6
agtcgctggc tactgctgcg ca                                             22

<210> SEQ ID NO 7
<211> LENGTH: 16
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
cggctcgacg aattgc                                                    16

<210> SEQ ID NO 8
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
agttcgtcac gcaggacat                                                 19

<210> SEQ ID NO 9
<211> LENGTH: 22
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 9
caaccagccg ctgctgacgg tc                                             22

<210> SEQ ID NO 10
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 10
cgcttcaggc acacaaact                                                  19

<210> SEQ ID NO 11
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
ccataagcat gcccgatt                                                   18

<210> SEQ ID NO 12
<211> LENGTH: 27
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 12
tcaattgctg gaccatttcg agtcgac                                         27

<210> SEQ ID NO 13
<211> LENGTH: 577
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13
taaccccgcg ataaagacag aagattatgc atacgagatc aaaggagccg gccttttctc     60
tagagatctc ttatttcct tgaagtcacc tgtttatgtt aaagcaggtg agcaggtata    120
cattcagtac gatctgaaca aaagcaatgc agaacttgct ctcgactatg gttttgtgga    180
atcaaaccct aaacggaact catatacttt aacaatagag ataccagaat cagacccatt    240
ctttggggat aagttggata ttgctgagag taacaagatg ggtgagaccg gatactttga    300
catagtagac ggccagactc ttcccgctgg tatgcttcag taccttcggc ttgtggctct    360
tggcggtcca gatgctttct tattagaatc tatcttcaat aacaccatat ggggtcatct    420
tgaattgcct gtaagtcgta caaacgagga actcatatgc cgtgttgtca gagatgcctg    480
caaatctgct ctgtctggtt ttgatacgac cattgaagag gatgagaagc ttctggacaa    540
aggaaagctt gagcctaggt tggaaatggc tctcaag                             577

<210> SEQ ID NO 14
<211> LENGTH: 446
<212> TYPE: DNA
<213> ORGANISM: Bordetella holmesii

<400> SEQUENCE: 14
gtgttgtyaa tgccctcaac gatgctggtg ttgagccggt ggcgacagcg agacagaatc     60

| | |
|---|---|
| ccgtgcagat aggcttttag cttgagcgcg aagtgagcca aggcggcgat gccgctgccc | 120 |
| tgagcctgtt gcagccagtg atcccatgcc tggcgggcgt agccggggtg ttggtagaac | 180 |
| cacagctgtt tgagctcatc gcgcatcaga taagcggtga gcaagggctg gttggcctgg | 240 |
| agcaactcgt ccaactttac cgattggcac ggatcgaggt ttttgcgatt gcgcagcagt | 300 |
| agccagcgac tggacttgat cacccggcgg gccggcttgt cgtgccgcaa ctggttcgct | 360 |
| tggtctacac gcacccggtc tatcacttca cggccgtact tggccacgac gtggaacagg | 420 |
| tcgtagacga tctcggcgtt ggggca | 446 |

<210> SEQ ID NO 15
<211> LENGTH: 1190
<212> TYPE: DNA
<213> ORGANISM: Bordetella parapertussis

<400> SEQUENCE: 15

| | |
|---|---|
| gctggatcgc aagttgatgg agtcgctggg aggctggcag ggctatggcg tcgaacgcgt | 60 |
| ggaatggccc gaagacccag gccgcacgct gtcgatctat ttgaagccaa cggccaaggt | 120 |
| gatgctgtgc gagcagtgcg gcgcgcggtg tcgccaggtg catgagacca cggttcgacg | 180 |
| ggtgcgagat ctgccgttat tcgagtatcg ggtcgttctg cacgtgccgc gccgacgctt | 240 |
| gtggtgtgag caatgcggcg gcccgcgcct ggagcggctt gcctggctgg ggcgatatca | 300 |
| acgggtgacg gatcggctgg cgcaggcctg cagccaattg ctgcaatcga gcaacgtgca | 360 |
| ggcggtggcg aggttcttcg agctgggttg gcataccgtc aagacgctgg acaaggctcg | 420 |
| gctgcgtgcg tcgtgcgcg aaccggattg gtccaagatc gagtatttgg cgatggacga | 480 |
| gtttgccctg cacaaagggc atcgctacgc gacagtggtg gtcgatccga tcggcaggca | 540 |
| ggtgctgtga attggcccag gacgctcacg cgagacggcc cggcgttct tcgaacaatt | 600 |
| gccgcctggg gccgcccaac gcatcaaggc cgttgccatc gacatgacca ccgcctacga | 660 |
| gttggagatc caggcccaca gcccacaggc ggagatcgtc tatgacttgt tccatgtcgt | 720 |
| ggccaagtat ggacgagagg tcattgatcg ggtgcgcgtg gatcaggcca atcaactacg | 780 |
| ccaggatcgt cccgcacgca ggatcatcaa atcgagtcgc tggctgctgc tgcgcaaccg | 840 |
| tgacaacctg atcggcagc aggccgtccg gctcgacgaa ttgctgcaag ccaaccagcc | 900 |
| gctgctgacg gtctatgtcc tgcgtgacga actcaaacgg ctctggttct accaaagacc | 960 |
| tgcctgggca agacaagcct ggaaccactg gtacgagcag gccgagcaaa gcggaatagc | 1020 |
| cgccttgaac accttcgctc agcgcttgaa aggctatctg cacggcatcc tggccagatg | 1080 |
| ccgacatccc ctgaacacca gcattgtcga gggcatcaac aacactatca aggtcatcaa | 1140 |
| gcggcgcgct tacggctacc gcgaccagga atacttcttc ctcaaaatcc | 1190 |

<210> SEQ ID NO 16
<211> LENGTH: 1055
<212> TYPE: DNA
<213> ORGANISM: Bordetella pertussis

<400> SEQUENCE: 16

| | |
|---|---|
| gttaggtgtg aagattcaat aggttgtatg catggttcat ccgaaccgga tttgagaaac | 60 |
| tggaaatcgc caccccccca gttcactcaa ggagcccggc cggatgaaca cccataagca | 120 |
| tgcccgattg accttcctac gtcgactcga aatggtccag caattgatcg cccatcaagt | 180 |
| ttgtgtgcct gaagcggccc gcgctatgg ggtcaccgcg ccgactgtgc gcaaatggct | 240 |
| gggccgcttc ctggctcagg gccaggcggg cttggccgat gcgtcctcgc gcccgacggt | 300 |

```
ctcgccccga gcgattgcgc cggccaaggc gctggctatc gtggagctgc gccgcaagcg      360
gctgacccaa gcgcgcatcg cccaggcgct gggcgtgtca gccagcaccg tcagccgcgt      420
cctggcccgc gccggtctgt cgcacctggc cgacctggag ccggccgagc cggtggtgcg      480
ctacgagcat caggcccccg gcgatctgct gcacatcgac atcaagaagc tgggacgtat      540
ccagcgccct ggccaccggg tcacgggcca ccgacgcgat accgttgagg gggccggctg      600
ggacttcgtc ttcgtggcca tcgatgacca cgcccgcgtg gccttcaccg acatccaccc      660
cgacgagcgc ttccccagcg ccgtccagtt cctcaaggac gcagtggcct actaccagcg      720
cctgggcgtg accatccagc gcttgctcac cgacaatggc tcggcctttc gcagccgcgc      780
cttcgccgcg ctgtgccatg agctgggcat caagcaccgc tttacccgac cttaccgccc      840
acagaccaat ggcaaggccg aacgcttcat ccagtcggcc ttgcgtgagt gggcttacgc      900
tcacacctac cagaactccc aacaccgagc cgatgccatg aaatcctggt tacaccacta      960
caactggcat cgaccccacc aaggcatcgg gcgcgctgta cccatctcca gactcaacct     1020
ggacgaatac aacctattga cagttcacag ttagg                                1055

<210> SEQ ID NO 17
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 17
gcttcagtac cttcggcttg                                                   20

<210> SEQ ID NO 18
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 18
ttgcaggcat ctctgacaac                                                   20

<210> SEQ ID NO 19
<211> LENGTH: 21
<212> TYPE: DNA
<213> ORGANISM: Artificial Sequence
<220> FEATURE:
<223> OTHER INFORMATION: Description of Artificial Sequence: Synthetic
      probe

<400> SEQUENCE: 19
tggctcttgg cggtccagat g                                                 21

<210> SEQ ID NO 20
<211> LENGTH: 150
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 20
gcttcagtac cttcggcttg tggctcttgg cggtccagat gctttcttat tagaatctat       60
```

```
cttcaataac accatatggg gtcatcttga attgcctgta agtcgtacaa acgaggaact      120
catatgccgt gttgtcagag atgcctgcaa                                       150
```